United States Patent
Sidenmark

(10) Patent No.: US 8,581,433 B2
(45) Date of Patent: Nov. 12, 2013

(54) WAVE POWER PLANT AND TRANSMISSION

(75) Inventor: Mikael Sidenmark, Karlskrona (SE)

(73) Assignee: Ocean Harvesting Technologies AB, Karlskrona (SE)

( * ) Notice: Subject to any disclaimer, the term of this patent is extended or adjusted under 35 U.S.C. 154(b) by 506 days.

(21) Appl. No.: 12/867,431

(22) PCT Filed: Feb. 20, 2009

(86) PCT No.: PCT/SE2009/000100
§ 371 (c)(1),
(2), (4) Date: Oct. 5, 2010

(87) PCT Pub. No.: WO2009/105011
PCT Pub. Date: Aug. 27, 2009

(65) Prior Publication Data
US 2011/0018275 A1  Jan. 27, 2011

(30) Foreign Application Priority Data

Feb. 20, 2008 (SE) ........................................ 0800395
Oct. 10, 2008 (SE) ........................................ 0802165

(51) Int. Cl.
*F03B 13/10* (2006.01)
*F03B 13/12* (2006.01)
*H02P 9/04* (2006.01)

(52) U.S. Cl.
USPC .......................................................... 290/53

(58) Field of Classification Search
USPC .......................................................... 290/53
See application file for complete search history.

(56) References Cited

U.S. PATENT DOCUMENTS 1,292,223 A * 1/1919 Anell ............................. 60/504
3,567,953 A   3/1971 Lord
(Continued)

FOREIGN PATENT DOCUMENTS

FR  2 339 071 A1  8/1977
FR  2 409 396 A1  6/1979
(Continued)

OTHER PUBLICATIONS

International Search Report Issued in PCT/SE2009/000100, dated May 20, 2009.
(Continued)

*Primary Examiner* — Pedro J Cuevas
(74) *Attorney, Agent, or Firm* — Potomac Patent Group, PLLC

(57) ABSTRACT

A wave power plant includes a buoy and a power train. In the power train a driveshaft is arranged, which is driven to rotate either when the buoy rises or sinks, but always in the same direction. The driveshaft is mechanically coupled to one of the rotating parts of an electric generator and drives it for generating electric current. Furthermore, an energy accumulation device is provided which is also coupled to the driveshaft to accumulate energy when the buoy is rising or sinking and the driveshaft is rotating for driving the generator during the other of the rising and sinking movements. The coupling between the energy accumulation device and the driveshaft can extend via the other rotatable part of the generator, the air gap between the parts of the generator and the first part of the generator. The coupling over the air gap gives a torque, which drives the second part to rotate in one direction and which also counteracts the rotation of the driveshaft. The second part of the generator is driven by the energy accumulation device to rotate in the same direction, when the torque from the driveshaft does not exceed the counteracting torque.

26 Claims, 24 Drawing Sheets

(56) References Cited

U.S. PATENT DOCUMENTS

| | | | |
|---|---|---|---|
| 4,145,885 A * | 3/1979 | Solell | 60/504 |
| 4,241,579 A | 12/1980 | Borgren | |
| 4,242,593 A | 12/1980 | Quilico et al. | |
| 5,066,867 A * | 11/1991 | Shim | 290/53 |
| 5,424,582 A * | 6/1995 | Trepl et al. | 290/53 |
| 5,889,336 A * | 3/1999 | Tateishi | 290/53 |
| 7,045,912 B2 * | 5/2006 | Leijon et al. | 290/42 |
| 7,245,041 B1 * | 7/2007 | Olson | 290/53 |
| 7,319,278 B2 * | 1/2008 | Gehring | 290/53 |
| 7,683,500 B2 * | 3/2010 | Greenspan et al. | 290/53 |
| 7,791,213 B2 * | 9/2010 | Patterson | 290/53 |
| 8,084,877 B1 * | 12/2011 | Raisch | 290/53 |
| 8,276,377 B2 * | 10/2012 | Patton | 60/504 |
| 8,319,359 B2 * | 11/2012 | Akervoll | 290/42 |
| 8,397,497 B2 * | 3/2013 | Cucurella Ripoli | 60/497 |
| 8,405,241 B2 * | 3/2013 | Chen et al. | 290/53 |
| 8,421,259 B2 * | 4/2013 | Ardoise et al. | 290/53 |
| 8,441,139 B2 * | 5/2013 | Karimi | 290/53 |
| 2006/0273594 A1 | 12/2006 | Gehring | |
| 2007/0164568 A1 * | 7/2007 | Greenspan et al. | 290/53 |
| 2009/0102200 A1 * | 4/2009 | Greenspan et al. | 290/53 |
| 2010/0102562 A1 * | 4/2010 | Greenspan et al. | 290/53 |
| 2011/0304145 A1 * | 12/2011 | Raisch | 290/53 |
| 2012/0112472 A1 * | 5/2012 | Murray et al. | 290/1 R |
| 2013/0082465 A1 * | 4/2013 | Frich | 290/53 |
| 2013/0113214 A1 * | 5/2013 | McGrath | 290/53 |
| 2013/0127168 A1 * | 5/2013 | Dragic | 290/53 |
| 2013/0134714 A1 * | 5/2013 | Daqian | 290/53 |

FOREIGN PATENT DOCUMENTS

| | | |
|---|---|---|
| FR | 2 869 368 A1 | 10/2005 |
| GB | 2 062 113 A | 5/1981 |
| JP | S5322934 A | 3/1978 |
| JP | 03168363 A | 7/1991 |
| JP | 11-6472 A | 1/1999 |
| WO | 03/058054 A1 | 7/2003 |
| WO | 2005/038244 A1 | 4/2005 |
| WO | 2005/054668 A1 | 6/2005 |
| WO | 2007/084013 A1 | 7/2007 |

OTHER PUBLICATIONS

Extended European Search Report issued in corresponding European application No. 09 71 1692, date of mailing Mar. 7, 2013.

* cited by examiner

Maximum water level
Normal water level

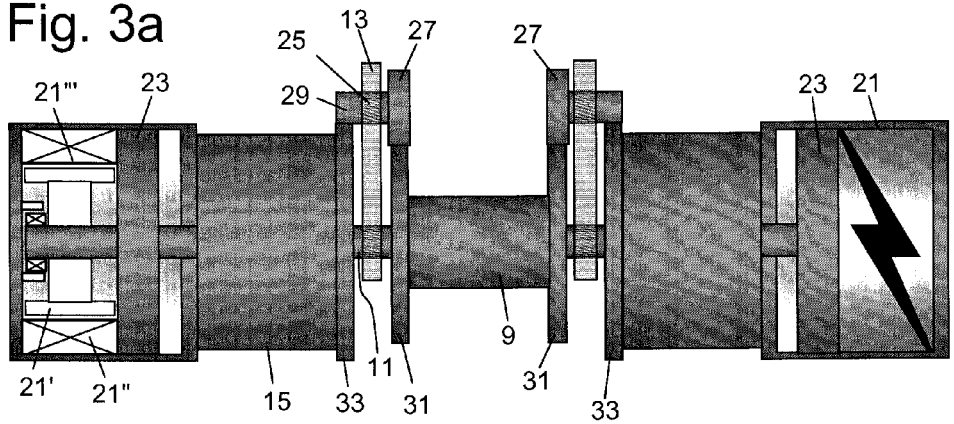
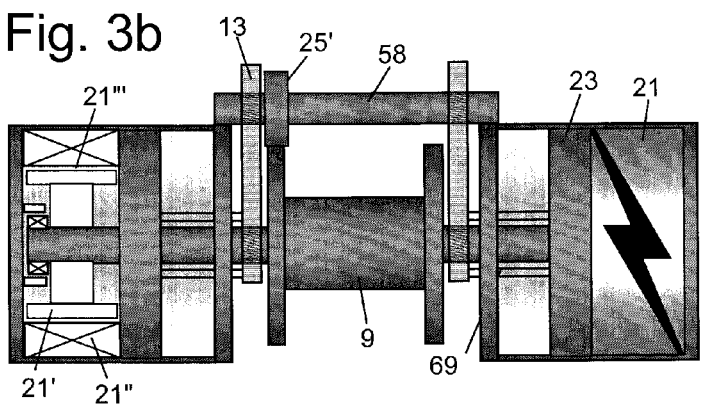
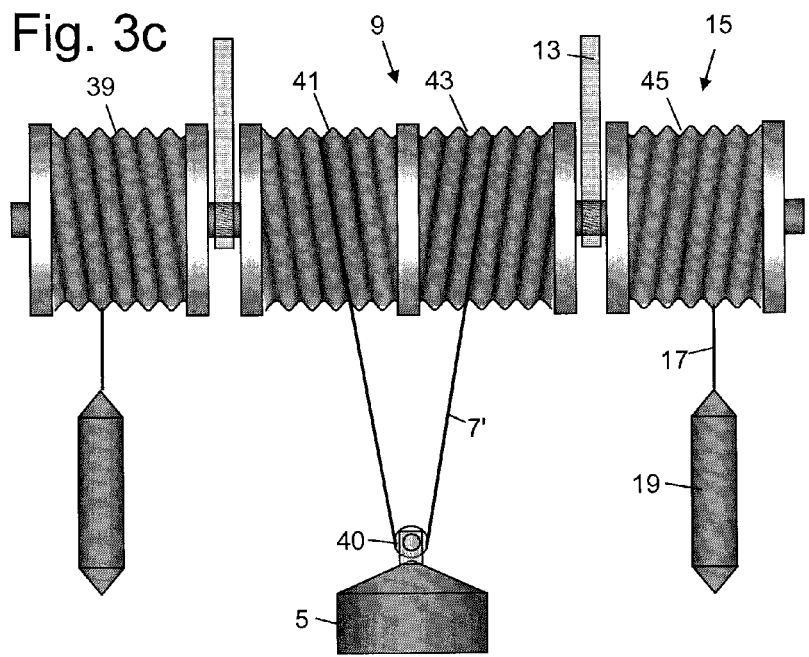

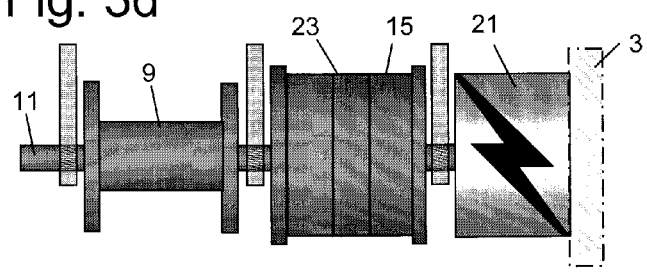
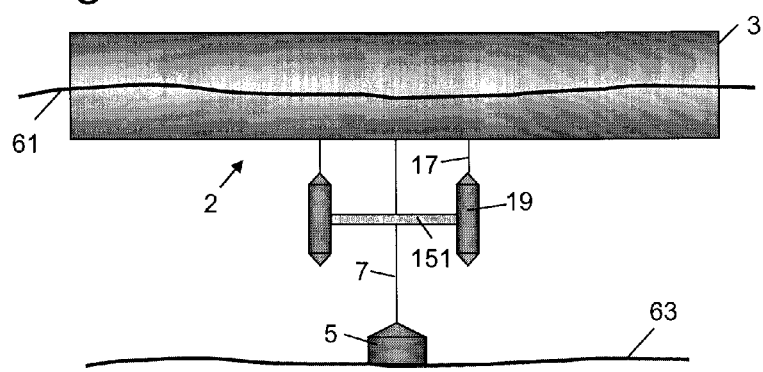
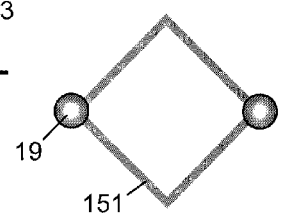
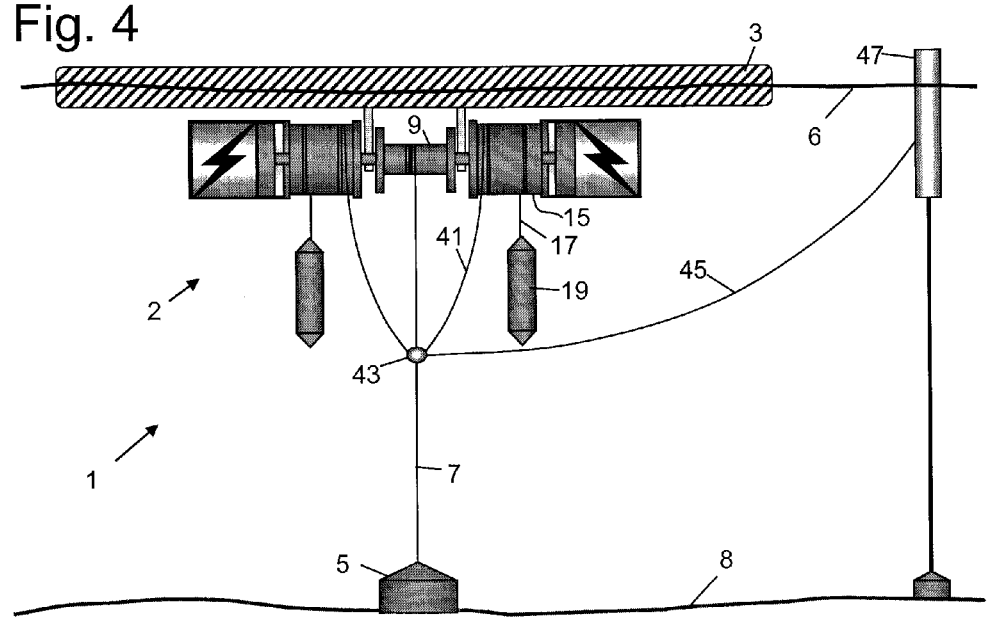

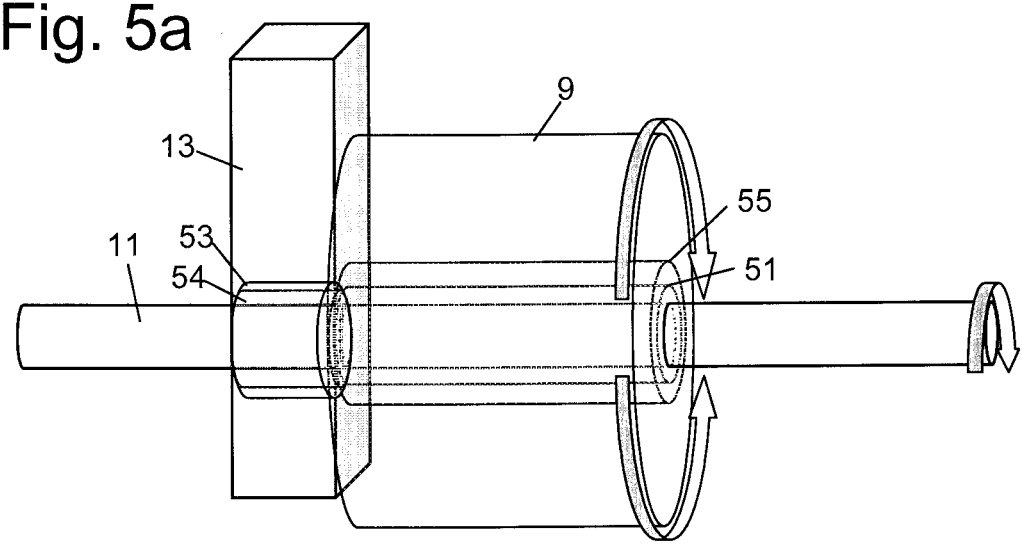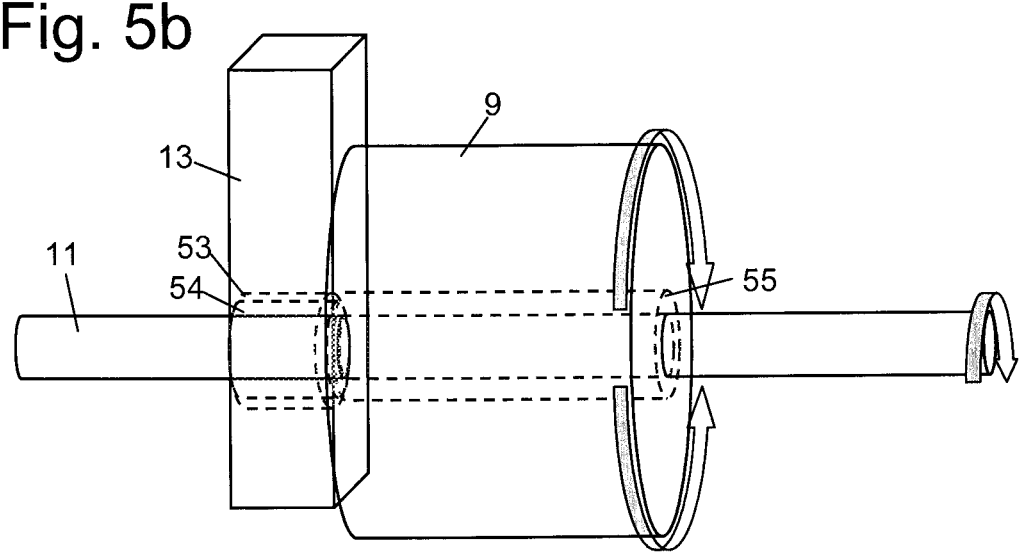

—— Vertical movement of bouy
······ Torque transfer

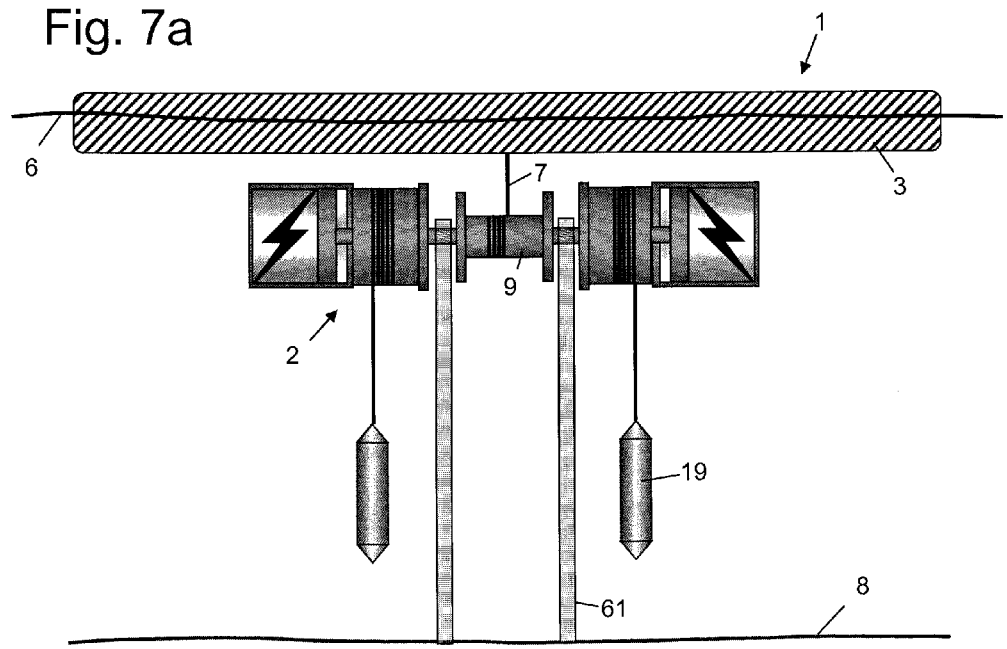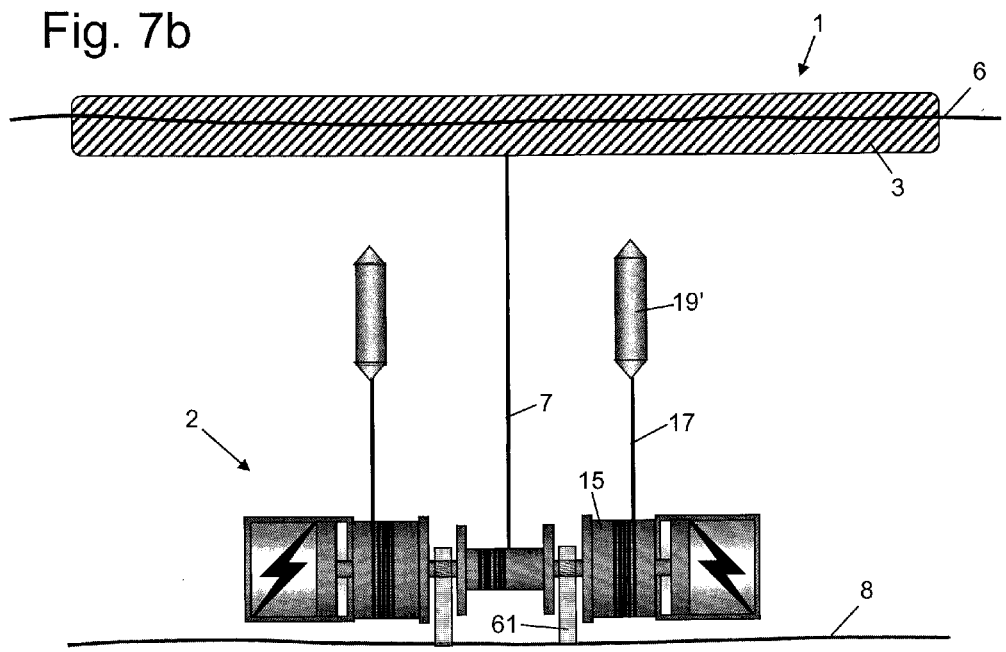

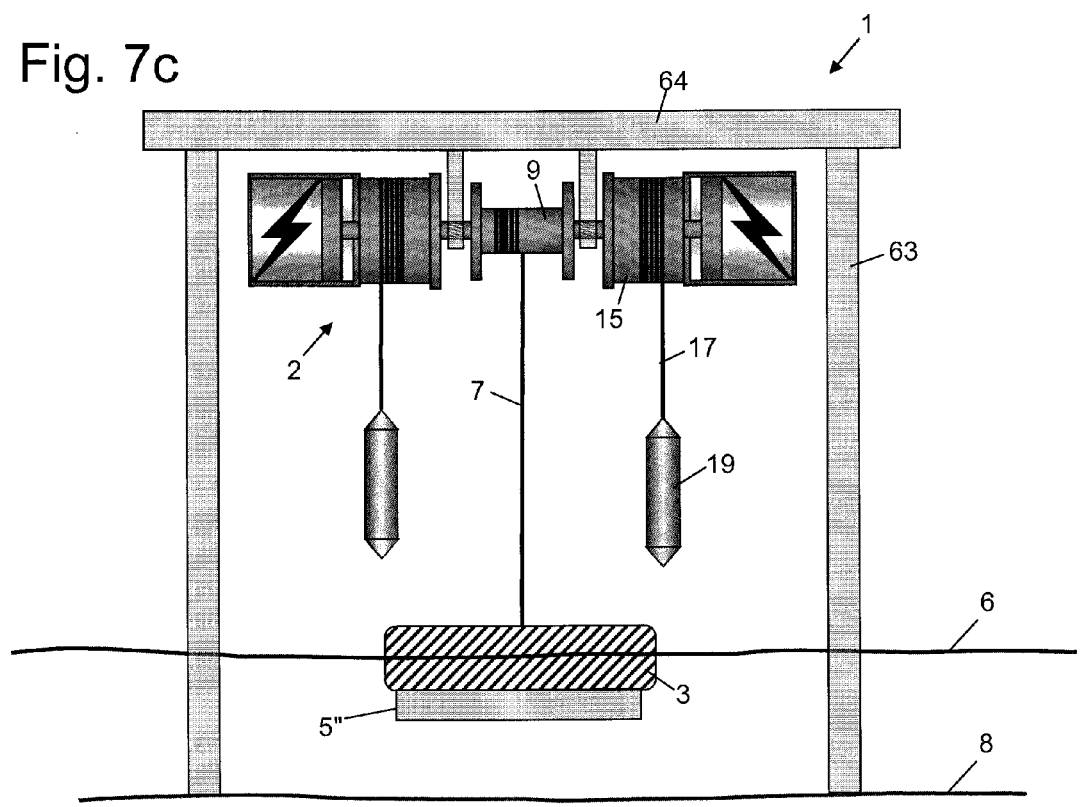

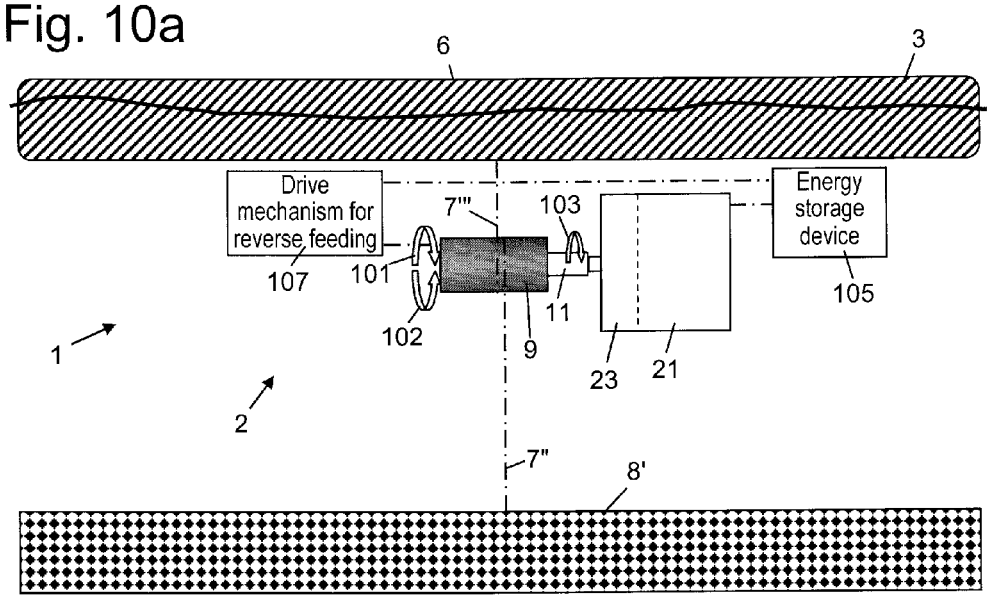
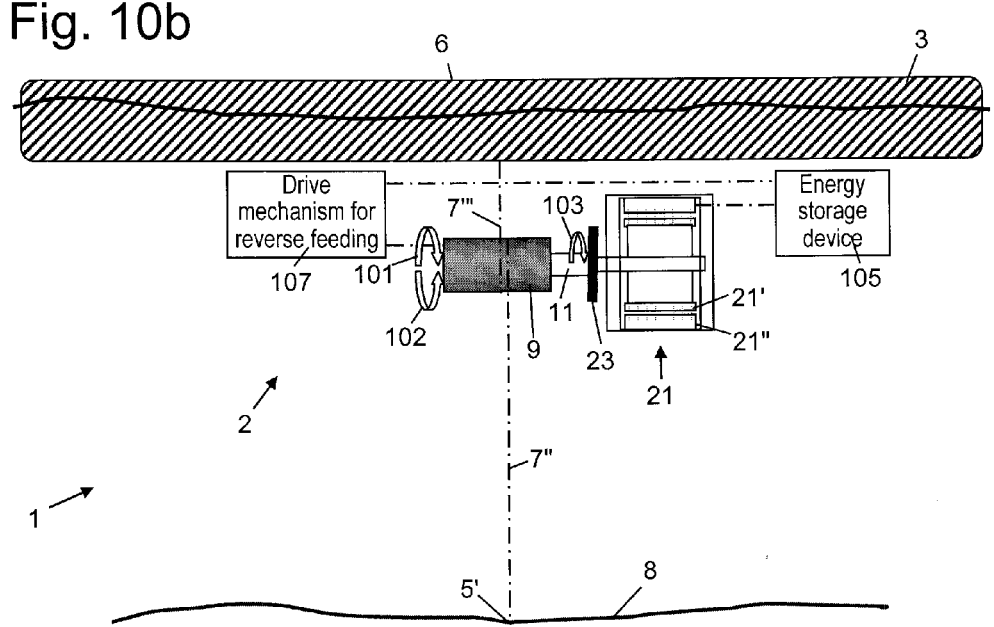

Fig. 11a
Prior art
Fig. 11b  Fig. 11c
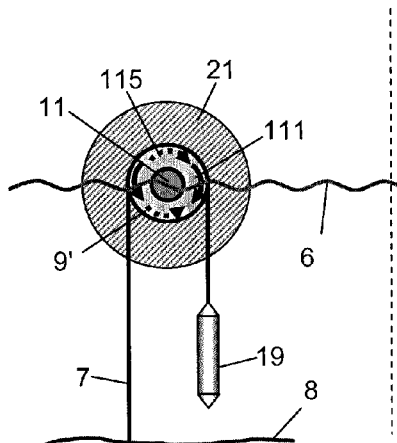
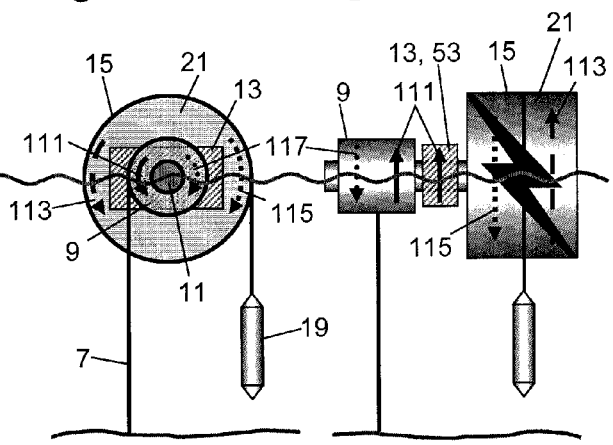
→ Absorption of wave energy 111    ┈▶ Driving of generator 115
┈▶ Reverse feeding 117              ─▶ Accumulation of wave energy 113
Fig. 11d  Fig. 11e
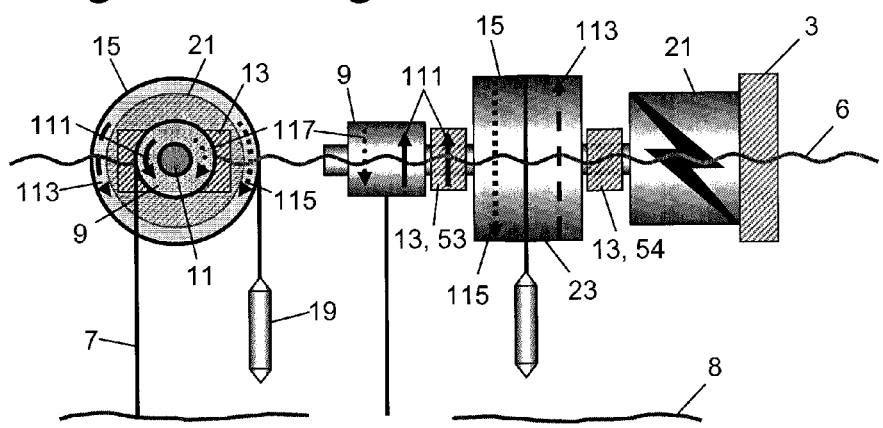
→ Absorption of wave energy 111    ┈▶ Driving of generator 115
┈▶ Reverse feeding 117              ─▶ Accumulation of wave energy 113

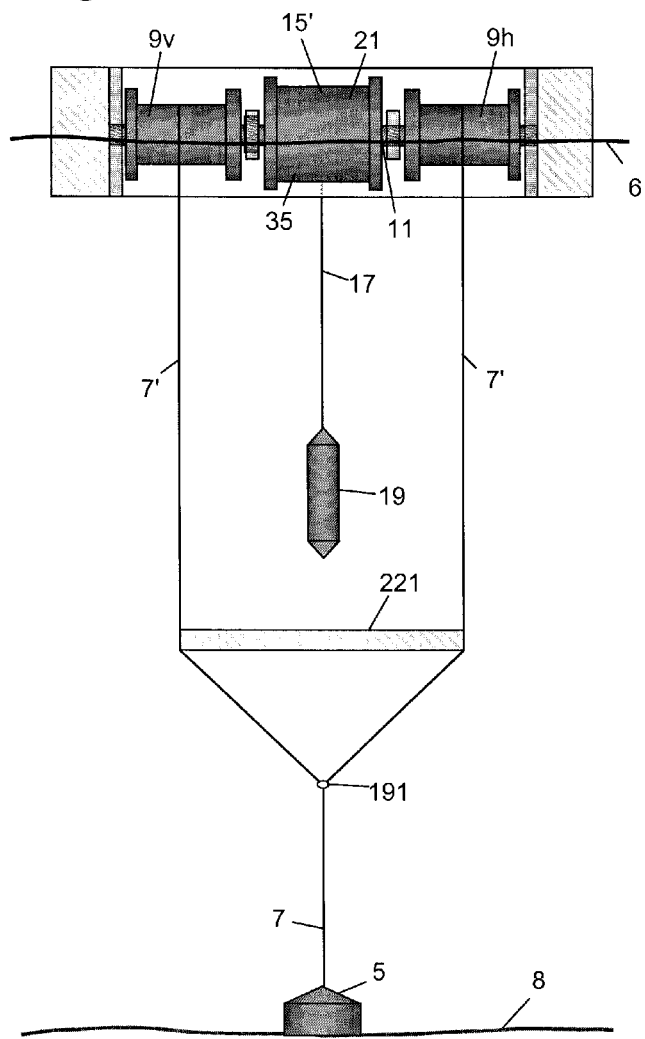
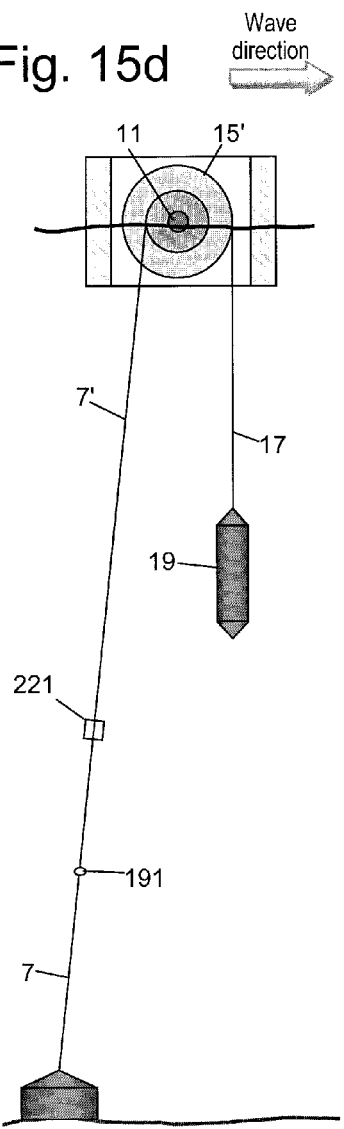
Fig. 15c
Fig. 15d

— Wave height
⋯ g-force
— - Electrical load
⋯⋯ Rotation speed
- - - Power

— Wave height
⋯ g-force
— - Gear ratio CVT
⋯⋯ Rotation speed
- - - Power

— Wave height
⋯ g-force
— - Torque transfer
⋯⋯ Power
- - - Rotation speed

WAVE POWER PLANT AND TRANSMISSION

RELATED APPLICATIONS

This application claims priority and benefit from Swedish patent application No. 0800395-6, filed Feb. 20, 2008, and Swedish patent application No. 0802165-1, filed Oct. 10, 2008, the entire teachings of which are incorporated herein by reference.

TECHNICAL FIELD

The present invention relates to a wave power plant for producing electric energy from movements of water waves, a method of producing electric energy from more or less intermittent mechanical energy, such as more or less periodical movements of a body, and a transmission for power plants to be used when such more or less intermittent mechanical energy is available.

BACKGROUND

Wave power has a large potential of becoming cost efficient since the energy density in ocean waves is very high (approximately 1000 times higher than in the wind), this allowing small wave power plants in relation to the capacity thereof. Furthermore, wave energy is more predictable than for instance wind power since waves are built by the wind during a long period of time and then continue as swell also after the wind has subsided. This results in slow variations in the average energy content of the waves, which gives system advantages when wave power plants are connected to the general electric power distribution network.

A reason why there are, in spite of this potential, so few competitive solutions today is that wave energy is difficult to master. The ocean is a rough environment with high material stress. In stormy weather the energy levels can be a 100 times higher than normal. The wave motion is oscillating and has never ceasing variations in height, length and time period (velocity) from wave to wave, this giving large variations in the energy absorbed by a wave power plant. For direct driven operation, i.e. when the generator in the wave power plant is driven according to the momentary movement of the wave, this results in a low utilization of the power plant, i.e. the so called capacity factor takes a low value. The power of the generator shifts between zero and a top level twice every wave period. The top level may also change very strongly from wave to wave. The general electric power distribution network requires relatively stable levels, both in delivered power and voltage, this resulting in that the electric control systems for this kind of wave power plants must, after the generation, make the levels of these quantities more even. Also, the uneven levels result in a costly over-dimensioning of the total electrical system of a wave power plant in order to obtain a proper handling of the top power levels.

To make wave power competitive a wave power plant is required that can efficiently absorb the wave energy at the same time as the motive force applied to the generator is levelled or equalized so that a higher capacity factor is obtained. Also, a low system complexity and an efficient use of components are required. Moreover, the structure of the wave power plant must be storm proof and have a long lifetime and low operational and maintenance costs that can be achieved by a construction allowing long service intervals and including wearing parts that can be easily accessed.

Wave power technology has been developed for a long period of time but up to now it has not been possible to arrive at a method and a design of a wave power plant, where it has been possible to combine the necessary properties as described above.

A frequent method of capturing the energy of water waves is to use the vertical movement of the water. Installations that use such technology are sometimes called "point absorbers". One method of using the vertical movements comprises a buoy having a bottom foundation and an anchor wheel. The bottom foundation is firmly positioned on the sea-floor and is connected to the buoy which follows the ocean surface, i.e. the wave movements. When the surface rises and thereby lifts the buoy, a motive force is created which is converted to a rotational movement by a driving bar connected between the foundation and the buoy or by a wire or chain which runs over an anchor wheel journalled for rotating at the buoy or in the foundation and which is at an opposite end connected to the foundation or the buoy, respectively. The motive force increases due to the increased motion speed of the waves when the wave height becomes higher. The rotation direction and speed of an anchor wheel, if such a wheel is used, is directly dependent on the vertical direction and motion speed of the waves. However, this is not optimal for coupling a conventional generator to the anchor wheel to produce electric energy.

In order to make a wave power plant driving a conventional rotating generator efficient, the vertical movements of the waves must be converted into a unidirectional rotational movement, and the rotation speed of an electric generator connected to the transmission must be stabilized. In a device, as described above, using a driving bar, wire or chain, which is secured to the bottom of the sea or in a frame structure and which runs along or over an anchor wheel journalled in a buoy, this problem can be solved in the following way. When the buoy is lifted by a wave, a motive force over the anchor wheel is produced. Thereupon, when the wave falls, an anti-reverse mechanism is disengaged and the anchor wheel is rotated backwards by a counterweight. Then, the motive driving is only active during the rise of the wave and completely ceases when the wave sinks, this not being satisfactory. Attempts have been made to reverse the rotation direction, so that an electric generator driven by the anchor wheel is driven by the counterweight in the same direction also when the wave sinks. It has also been attempted to reverse the rotation direction of the generator. However, changing the rotation direction of a mechanical transmission or of the generator twice in every wave period results in heavy mechanical wear. Even though the rotation direction can be made unidirectional by the transmission, the rotation speed follows the speed of the vertical movement, this causing the power output from the generator to vary according to the speed of the wave movements. This gives to a low capacity factor and high attenuating effects since the mass of the generator all the time must alternately be accelerated and decelerated. In order to make the motive force and rotation speed of a generator more even using a mechanical transmission multiple buoys can cooperate, a phase shift existing between the buoys. However, this only works optimally in the case where the buoys are evenly distributed over a wave period, which very seldom occurs since the length and the speed of the waves always vary. Also, the transmission system becomes more complex and hence hydraulic mechanisms are frequently used in systems of this type. However, hydraulic devices results in complex systems having large transmission losses.

A wave power plant of the type described above is disclosed in the published French patent application 2869368, which comprises a floating platform or buoy. Lines run over pulleys at the buoy, one end of the lines being attached to the bottom and the other end carrying a counterweight. The rotation of the pulleys is transferred to generators. The rotation speed and the power output from the generator vary according to the movements of the waves. A similar wave power plant is disclosed in U.S. Pat. No. 4,242,593, which drives a wheel or pulley in the buoy only when the buoy is rising. A gearbox is provided for gearing up the rotation speed of the wheel or pulley in the buoy to make it suited to be used for driving a generator. In U.S. Pat. No. 5,889,336 and the published Japanese patent application 11-6472 a similar wave power plant is disclosed that includes a chain which is at one end attached to a bottom foundation end and has at its other end a counterweight. The chain passes over a chain pulley in a buoy. The chain pulley is connected to a generator through a directly acting transmission, which is arranged to make the generator always rotate in the same direction. The rotation speed depends on the speed of the vertical movement of the buoy.

A wave power installation of a somewhat different type is disclosed in U.S. Pat. No. 4,241,579. A driveshaft is mounted to be elevated and lowered between the water surface and the bottom. A number of buoys are by lines connected to counterweights and the lines pass around the common driveshaft for driving it only when the respective buoy has an upward movement. In the published British patent application 2062113 a wave power plant is disclosed including a plurality of different drive mechanisms, each one of which comprises a buoy and a counterweight/bottom foundation/additional buoy and which act on a common driveshaft through one-way couplings. In the published French patent application 2339071 a buoy is used, which is connected to one end of a chain and by the chain drives a driveshaft placed above the water surface to rotate. The other end of the chain carries a counterweight, which is also placed above the water surface. The connection to the driveshaft is of a unidirectional type and the driveshaft may be driven by several such buoys through chains.

In the published International patent application WO 2005/054668 a wave power plant including a buoy which is attached to an end of a line is disclosed. The other end of the line is more or less wound around a drum placed on the bottom of the sea. The drum is connected to a return spring and a generator and drives the generator in both the rising and sinking movements of the buoy. In the wave power plant according to the published International patent application WO 03/058054 the buoy acts as an winding drum for a line, the lower end of which is connected to a bottom foundation. A return spring, a gear up mechanism and a generator are arranged inside the buoy. The generator is driven in both the rising and sinking movements of the buoy.

SUMMARY

It is an object of the invention to provide an efficient wave power plant.

In a wave power plant energy from water waves in a pool of water is, during parts of the movements of the water waves, absorbed for driving an electric generator, the term "pool of water" herein taken to include any body or mass of water. However, part of the absorbed energy is temporarily accumulated or stored in some suitable mechanical way for driving the electric generator during other parts of the movements of the water waves. Thereby, an equalization over time of the motive force acting on the electric generator can be achieved. For the temporary mechanical accumulation of energy a change of potential energy can be used, such as variations of the potential energy of a suitable body. For example, the change of potential energy can be based on elastic forces or on gravitational forces. In the latter case a floating body can be used, i.e. a body having a density lower than that of water, which is located at a varying distance from the water surface and thereby indirectly uses the gravitational forces. Alternatively, the body used for accumulation of energy can in the same case be a counterweight, i.e. a body having a density higher than that of water, which uses the gravitational forces in a more direct way. In these cases, the body may be connected to some elongated means, such as a line, wire or chain, which in the case where it is flexible can be more or less wound around a counterweight drum. The counterweight drum can be journalled for rotation at a buoy or at a stationary rack or frame placed on or attached to the bottom of a pool of water. In one case the counterweight drum can be mechanically connected to a rotating part of an electric generator and the weight or the buoyancy of the body is used for continuously driving the counterweight drum to rotate in an opposite relative rotation direction compared to the rotation direction of a driveshaft, which is connected to another elongated means, also here for example a line, wire or chain.

The driveshaft is mechanically arranged for a unidirectional rotation only, driven for example by the rising or sinking movements of a water surface or more particularly by alternately rising and sinking movements and/or alternating rocking or tilting, back and forth movements of a buoy, i.e. a body having a density lower than that of water, which is floating at the water surface, or alternatively by some other form of oscillatory movement or combination of oscillatory movements in the waves or in the water. In the above mentioned cases the electric generator is mechanically connected in a transmission path between the driveshaft and the counterweight drum. The electromagnetic coupling between the parts in the electric generator over the air gap of the generator gives a limited torque in relation to the rotation speed of the generator, the mechanical torque produced by the counterweight drum and the electrical load of the generator. When the driveshaft is rotating faster than the rotational speed in the generator, the counterweight drum is rotated in a first rotation direction, this causing the counterweight to be hoisted up to, accumulating potential energy. When the driveshaft is rotating slower than the rotation speed of the generator or is still-standing still, the counterweight drum rotates in a second rotation direction, this causing the counterweight to be lowered, thereby releasing potential energy.

As an energy accumulation device using elastic forces, an elastic or resilient mechanism may be used, in which the energy is accumulated as a tension in a spring or generally as elastic energy. In one case such an elastic device may comprise a container or tank for accumulation of energy as a gas pressure. Then, the container may be connected to a combined compressor or gas pump and a pneumatic motor such as a scroll pump. This device may have a moving part directly connected to one of the parts of the generator.

In such a wave power plant it is possible achieve, using an energy accumulation device, also called energy storing device, and suitable couplings, an equalization of the kinetic energy of the water waves in an efficient way, so that the generator can be driven to continuously generate electricity at a relatively even level.

Generally, a wave power plant or in its most common form a power plant using movements, such as more or less periodic movements, of the water of a pool of water, can comprise:

A buoy or other device, which is arranged at or in the pool of water to be made, in some way, to move by movements of the water in the pool of water. Then, the buoy or the other device is constructed and placed so that it itself, because of movements in the water, obtains movements alternating between a movement in one direction and a movement in another direction, that is different from the first direction. The movements in the water can comprise wave movements in the water or at the surface of the water, alternating movements, i.e. alternating back and forth movements in the water or at the surface of the water or generally movements alternating between a movement in one direction and a movement in another direction in the water of the pool of water. In the case of a buoy, floating at the surface of the water in the pool of water, this can mean that the buoy, for the up and down movements of the water surface, alternately rises and sinks and/or alternately rocks or tilts back and forth. In general then, the buoy has an average density lower than that of water. The other device arranged at or in the pool of water may for example comprise a body having the same density as or a higher density than that of water, which is designed to follow the movements of the water, or a device that is being alternately compressed and expanded due to pressure differences in the water which occur when water waves pass.

A driveshaft, which is rotationally journalled at some part of the wave power plant. In different designs, it can be journalled at the buoy or at the other device. Alternatively it can be journalled for rotation at a device that is rigidly attached to the bottom of the pool of water, or generally to some device arranged to counteract the movements of the water in the pool of water, such as a body having a relatively large mass or weight.

A first elongated means, which both is connected to a device arranged to counteract the movements of the water in the pool of water, for example a fixed point at the bottom of the pool of water or a body having a relatively large mass or weight, or to the buoy, respectively, depending on the place where the driveshaft is mounted, and is connected to the driveshaft. The first elongated means may be a flexible means, such as a line, wire or chain, but it can also be stiff, in that case for example comprising a rack gearing segment.

An electric generator connected to the driveshaft and comprising two parts that are rotatable in relation to each other, a first part and a second part, often called rotor and stator, respectively. An air gap exists between the two rotatable parts.

An accumulation device for temporary mechanical storage of energy as described above.

The buoy or the similar device is arranged and the buoy or the other device, the first elongated means, the device arranged to counteract the wave movements, the driveshaft and the energy accumulation device are connected to each other, so that the connection between the first elongated means and the driveshaft makes the driveshaft rotate, substantially for first movements of the water surface or for first movements of the buoy or the similar device, in only one direction, thereby driving said two part of the electric generator to rotate in relation to each other in a first direction and generate electricity and at the same time also supply energy to the accumulation device. Thus, energy from the rotation of the driveshaft is hereby partly converted to electric energy, which is delivered from the electric generator, partly to energy which is stored in the energy accumulation device. The first movements can for a buoy be the movements into which the buoy is set by either one of the up- or down-going movements of the water surface.

The energy accumulating device is arranged to drive, for substantially second movements, that are substantially different from the first movements, of the buoy or the similar device, said two parts of the electric generator to rotate in the same first rotation direction in relation to each other, thereby generating electric current having the same polarity as when the driveshaft is driving said two parts of the electric generator to rotate in relation to each other. The second movements can for a buoy be those movements, into which the buoy is set by the other ones of the up- and down-going movements and which thus are substantially different from said either one of the up and down going movements of the water surface.

The first movements of the buoy or the other body can take place in a direction, which is mainly opposite the direction, in which the second movements of the buoy or the other device occur. Thus, the first movements can take place in a forward direction whereas the second movements take place in a backward direction, either as a translation movement, for example upwards or downwards, or as a rotational movement, i.e. angularly, or as a combined translation and rotational movement.

The driveshaft may be mechanically connected, for example via a mechanical gear, to the first part of the electric generator. An electromagnetic coupling exists in a conventional way over the air gap between the first and second parts of the electric generator at least when these parts are moving in relation to each other. In a special embodiment the energy accumulation device may be mechanically connected to the second part of the electric generator.

The connection of the energy accumulation device to the driveshaft via the second part of the electric generator and the first part of the electric generator and the electromagnetic coupling over the air gap therebetween gives a counteracting motive force that counteracts the rotation of the driveshaft when the driveshaft is rotating due to the connection between the first elongated means and the driveshaft, and then is driving the first part of the electric generator. Then, in the above mentioned special embodiment, the second part of the electric generator can rotate in a first direction due to the coupling to the drive shaft through the electromagnetic coupling over the air gap and the first part of the electric generator, when the motive force which is acting on the driveshaft through the coupling between the first elongated means and the driveshaft exceeds the counteracting motive force, energy being accumulated in the energy accumulation device due the mechanical coupling thereof to the second part of the electric generator. At the same time, the first and second parts of the electric generator are rotating in the same first direction in relation to each other. Furthermore, the second part of the electric generator is driven by the energy accumulation device to rotate in the same first direction substantially when the motive force, which acts on the driveshaft through the coupling between the first elongated means and the driveshaft, does not exceed the counteracting motive force. Hereby, the first and second parts of the electric generator are made to continue to rotate in the same first direction in relation to each other also in this case.

As has been mentioned above, a mechanical gear may be arranged for coupling the driveshaft to the first part of the electric generator. Then, the driveshaft is suitably connected to an input side of the mechanical gear and the first part of the electric generator is mechanically connected to a first output side of the mechanical gear. In this case, the second part of the electric generator can be rigidly attached to the buoy, if the energy accumulation device is connected to a second output side that is different from the first output side of the mechanical gear. A mechanical gear can generally be regarded as comprising one input side having an input shaft and two output sides, one of the output sides comprising an output shaft and another output side comprising a housing or enclosure of the mechanical gear, see also the discussion below of only the transmission included in the wave power plant. For example a planetary gear, the input side may comprise a shaft connected to the planet gear carrier and the two output sides correspond to shafts connected to the sun gear and the ring gear, which may be connected to a second shaft or the housing of the planetary gear.

In the case including a buoy, the buoy can comprise a space which functions as an air pocket and in which at least the main part of the driveshaft is mounted as well as other rotating parts, such as winding drums, in the case where such are provided, and couplings between them. Such an air pocket can be a space filled with air, which at its bottom is delimited by a water surface and the other sides of which are different surfaces of the buoy. Then, the air pocket may be formed by a recess in the bottom surface of the buoy.

In one embodiment the energy accumulation device can comprise a counterweight, arranged as a lead, to also move upwards for said first movements of the buoy or the other device, thereby increasing its potential energy. The coupling between the buoy or the other device, the first elongated means, the driveshaft and the counterweight is then suitably arranged so that the counterweight moves downwards, for said second one of the movements of the buoy or the other device, thereby driving the parts of the electric generator to rotate in relation to each other in the first rotation direction. In the case of a buoy, it can for example mean that, for the first movements when the buoy e.g. is moving upwards, the counterweight is also moving upwards a distance, which is greater than the vertical distance that the buoy then vertically moves.

The energy accumulation device can in the same embodiments comprise a counterweight drum which is rotationally mounted to the driveshaft and a second elongated means for coupling movements of the counterweight to make the counterweight drum rotate. The second elongated means can be flexible or can be a flexible means such as a line, wire or chain, which at a lower end is attached to the counterweight and at its upper end is more or less wound around the counterweight drum. Furthermore, the driveshaft is connected to drive the first part of the electric generator to rotate and the counterweight drum can in a first case be coupled to rotate the second part of the electric generator, so that the electric generator generates electric current when its second part is rotated in relation to its first part and at the same time gives a torque counteracting this rotation. Hereby, the first and second parts of the electric generator can be made to always rotate in the same first direction in relation to each other.

In a second case a mechanical gear can be connected between the driveshaft and the first part of the electric generator. In this case where the driveshaft is connected to an input side of the mechanical gear, the first part of the electric generator is coupled to a first output side of the mechanical gear, the second part of the electric generator is rigidly attached to the buoy or the other device and the counterweight drum is mechanically coupled to a second output side different from the first output side of the mechanical gear. Thereby, the driveshaft can, for said first movements of the buoy or the other device, provide motive forces on both of the output sides of the gear, in order to rotate the first part of the electric generator and to rotate the counterweight drum to elevate the counterweight in relation to the driveshaft. The counterweight drum can, for said second movements of the buoy or the other device, provide a motive force, through its coupling to the second output side of the gearbox, in order to rotate the first part of the electric generator.

Furthermore, in the case including a counterweight and a counterweight drum, an electric cable for the electric connection of the generator can be provided which extends from the generator to the counterweight drum and is partly wound around it, which therefrom extends to a non floatable part which is slidable along the first elongated means and to which it is rigidly connected, so that the sliding part can be maintained at a constant distance beneath the counterweight, and which electric cable extends from the slidable part up to the water surface to be further connected to an electric load. It may allow the wave power plant to turn in the horizontal plane, such as when the direction of the water waves changes, without causing the electric cable to be entangled with the second elongated means.

An anchor drum can be mounted for unidirectional rotation around the driveshaft and further be coupled to the first elongated means to make the anchor drum rotate for the first ones of the movements of the buoy or the other device, thereby also making the driveshaft rotate. The first elongated means can be flexible, i.e. be a flexible means such as a line, wire or chain, which is at one end more or less wound around the anchor drum. A mechanism can be provided for rotating, for the second movements of the buoy or the other device, the anchor drum so that the flexible means is kept in a tensioned state. Hereby, it can also be counteracted that the wave power plant is moved away along the surface of the water. The mechanism can for example comprise a mechanical coupling between the energy accumulation device and the anchor drum or comprise an electric motor.

The bearing for the anchor drum, which only allows a unidirectional rotation around the driveshaft, at the same time allows the anchor drum, when rotating in the opposite direction, to drive the driveshaft to rotate in the opposite direction, which is the above mentioned only one direction. This bearing can comprise a coupling for limiting or disengaging the motive force with which the anchor drum then acts on the driveshaft.

A control system for controlling the electrical load of the electric generator can be provided that is arranged to adapt the rotational speed between the first and the second parts of the electric generator. In the case where the energy accumulation device comprises a counterweight or a floating body, control of the electrical load can also be used to adapt the vertical speed of the counterweight or of the floating body, respectively, whereby it also becomes possible for the counterweight or the floating body, respectively, to only move within an adapted or suitable vertical range. Also, the control system can be arranged to compensate for variations in the torque caused by the inertia of the mass of the counterweight or the floating body, respectively, by adjusting the rotation speed between first and the second parts of the electric generator. Thereby it can be achieved that the electric generator is capable of supplying a continuous, even power.

The wave power plant may have one or more of the following characteristics and advantages:

1. Accumulation of energy according to the description above can be used for equalizing the energy of the water waves and thereby generate electricity at an even level, this giving a high capacity factor of the generator together with associated power electronic circuits and connections, and a low complexity of the electric power system.

2. Excess energy from large waves can be accumulated and used over time to compensate for shortage of energy in smaller waves, this contributing to the high capacity factor.

3. Absorption of energy from the water waves can be limited while full power can be maintained even during very heavy wave conditions. It partly contributes to the high capacity factor, but it also works as a very simple and efficient storm protection system where the wave power plant all the time works in harmony with the waves, only absorbing the amount of energy that it has a capacity to convert.

4. The power output from the generator can be controlled by the fact that the rotation speed of the generator can be adapted to the average rotation speed of the driveshaft. This brings about that the wave power plant can deliver an even power level in relation to the current wave climate.

5. The wave power plant is highly scalable and its capacity and pattern for producing electric power can be optimized for specific wave climates for highest cost efficiency.

6. The wave power plant includes a completely mechanical transmission having a high efficiency, which in simple way converts the oscillating wave movements into a unidirectional rotation, well adapted to a standard electric generator having a rotating rotor.

7. The construction can for example mainly be made from concrete, a cheap material which is well tested for the ocean environment.

8. An electronically adjustable sliding clutch may be used, which is arranged to affect the winding of a line between a bottom foundation and the buoy and which also makes it possible to adjust the force needed to maintain the horizontal position of the wave power plant. Such a sliding clutch may replace and enhance the function of a counterweight, here called a lead, which is often used in similar constructions.

9. An anchor drum mechanically connected to the driveshaft can be used for winding more or less of the second elongated means according to the wave movements. Several revolutions of the anchor line can be wound around the anchor drum and hence the anchor drum has no technical limitations for wave heights that the installation can handle. The buoy follows the surface of the water in a harmonic way for all wave sizes without reaching any end position, this contributing to the fact that the wave power plant can very efficiently absorb wave energy, in spite of varying wave heights, and at the same time the strain on the construction during storm conditions is minimized.

10. Mechanical couplings may be provided, so that if the electric generator is supplied with electric energy from an external source and acts as an electric motor, the anchor drum can be controlled to perform a controlled winding of the line. It can give the wave power plant the property that it can be assembled on shore before it is towed to its installation site.

11. The installation can be done with a minimum of manual assistance. Mainly only an electric cable has to be manually connected, which can be done at the surface of the water from a boat. A bottom foundation connected to the second elongated means and the counterweight are attached to the buoy during transport to the installation site and then they can be released by control of mechanic couplings/locking devices.

12. The wave power plant can easily be designed to be suited for different installation depths.

13. A gearbox can be used to increase the rotation speed of the electric generator, this allowing the use of a smaller and more resource efficient high speed generator. Also, such a gearbox can make it possible to permanently attach the second part of the electric generator, the stator, to the buoy, by connecting the gearbox to the counterweight drum, which can simplify the electrical connection and encapsulation of the generator and reduce the rotating mass in the construction.

Generally, as described above, a method of producing electric energy from more or less periodic movement of a body, such as repeated upward and downward movements and/or rocking or tilting movements in two opposite directions, can comprise the following steps.

For first movements of the body, these movements can drive two parts of an electric generator to rotate in relation to each other in a first direction and thereby generate electric current and at the same time these movements can provide mechanical energy to an energy accumulation device.

For second movements of the body, which are substantially different from the first movements, the energy accumulation device can drive the two parts of the electric generator to rotate in the same first direction in relation to each other and thereby generate electric current having the same polarity as during the first movements of the body.

The transmission used in the wave power plant as described above can independently be used in other cases of power generation, where a driveshaft is driven intermittently, with changing directions and/or with varying speeds and/or torques. Generally then, the transmission comprises a driveshaft that is arranged to be driven and that by some suitable device, if required, can be made to always rotate in one rotation direction. Furthermore, an electric generator coupled to the driveshaft is provided, the generator comprising two parts that can rotate in relation to each other, and an energy accumulation device. The driveshaft drives the two parts of the generator to rotate in relation to each other in a first direction, thereby generating electric current. The energy accumulation device is coupled with the driveshaft and the electric generator, so that the driveshaft by its rotation can also supply energy to the energy accumulation device and so that the energy accumulation device can later deliver its stored or accumulated energy to assist in driving the parts of the generator to rotate in the same first direction in relation to each other. Thereby, electric current can be generated having the same polarity, when the rotation speed and/or the torque of the driveshaft is/are insufficient to drive the parts of the generator to rotate at a maintained rotational speed.

In the transmission, the driveshaft can be mechanically connected to the first one of the parts of the electric generator. In the generator there is, as conventional, an electromagnetic coupling over an air gap between the first and the second parts, at least during the movements thereof in relation to each other, said coupling giving some torque between the two parts. In a first case the energy accumulation device can be mechanically coupled to the second part of the electric generator.

Furthermore, in the transmission a gearbox, e.g. a planetary gearbox, can as described above be connected between the driveshaft and the generator, so that the driveshaft is mechanically connected to the input side of the gearbox or generally to a first rotational part of the gearbox. An output side of the gearbox or generally a second rotational part of the gearbox is then arranged to be driven from the outside to rotate with a varying rotational speed and/or torque in one rotation direction. One of the two parts of the electric generator is mechanically coupled to another output side of the gearbox, generally a third rotational part of the gearbox, and the energy accumulation device is mechanically coupled to the second part of the generator. The, the first and second rotational parts of the gearbox can cooperate to for example drive the third rotational part of the gearbox to rotate with a rotational speed that is higher than the rotational speeds than that speed that each of the parts by itself can achieve when the other of these parts stands still or is not driven.

The gearbox should in any case have the following functions:

When the first rotational part is driven from the outside, the second and the third rotational parts are also made to rotate.

When the first rotational part is not rotating, the third rotational part can drive the second rotational part to rotate.

The first, second and third rotational parts can also be arranged to rotate around the same geometric rotational axis, i.e. be coaxially mounted for rotation.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 3a is a front view of a power train including winding drums, a driveshaft and a generator in the wave power plant of FIG. 2a, FIG. 3b is a view similar to FIG. 3a in which parts of a generator are schematically shown and in which a spiral spring is used as an energy accumulation device, FIG. 3c is a front view of winding drums having specially designed winding surfaces, FIG. 3d is a schematic of a power train comprising a generator having a stationary stator, FIG. 3e is a front view of a wave power plant including a frame for interconnecting two counterweights, FIG. 3f is a top view of the frame of FIG. 3e for interconnecting two counterweights, FIG. 4 is a front view of the wave power plant of FIG. 2a having a specially designed electric cable connection, FIG. 5a is a detail view of an anchor drum and couplings thereof located at the shaft, FIG. 5b is a view similar to FIG. 5a for a different design of the couplings, FIG. 7a is a front view of an alternatively designed wave power plant including counterweights, FIG. 7b is a front view of an alternatively designed wave power plant including buoys instead of counterweights, FIG. 7c is a front view of yet another alternatively designed wave power plant including counterweights located above the water surface, FIG. 10b is a view similar to FIG. 10a of a wave power plant using the torque transferred over the air gap of a generator to obtain energy accumulation, FIG. 11a is a schematic of a previously known device for driving a generator in a wave power plant, FIG. 11b is an schematic similar to FIG. 11a but of a differently designed device for driving a generator having a stator that is also rotating, FIG. 11c is a view from a different side of the device of FIG. 11b, FIG. 11d is a schematic similar to FIG. 11b of a device arranged in a different way for driving a generator having a stationary stator, FIG. 11e is a view from a different side of the device of FIG. 11d, FIGS. 12a and 12b are views from two sides, illustrating the construction and function of a planetary gear.

DETAILED DESCRIPTION

Figure 1:
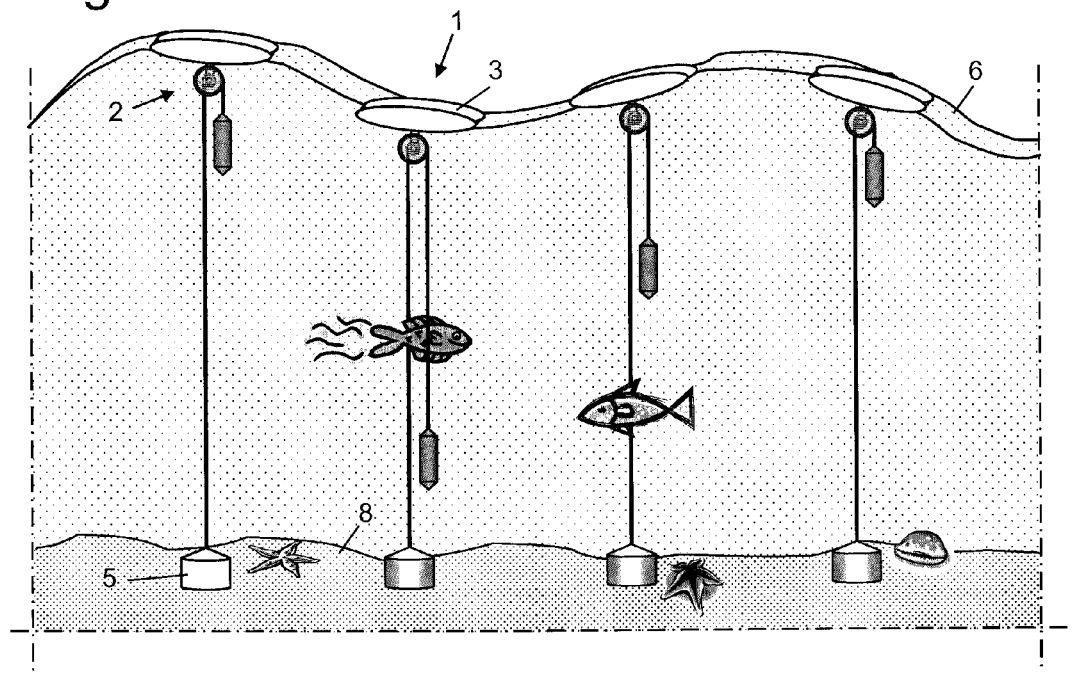
FIG. 1 is a schematic of a wave power installation comprising four separate wave power plants.

In FIG. 1 a wave power installation for producing energy from the movements of waves at a water surface 6 of a pool of water, e.g. movements of the water of an ocean, is shown. The wave power installation comprises one or more wave power plants 1, each including a buoy or a floating body 3, which is located at the water surface, e.g. floating thereon, and which to a higher or lower degree follows the movements of the waves. In the upward and downward movements of the water surface 6 the buoy is made to alternately rise or sink and/or alternately rock or tilt back and forth. Thereby a motive force can be created, in the case shown in relation to the bottom 8 of the water pool, such as a part rigidly attached to the bottom, e.g. a bottom foundation 5, which can have a mass large enough to keep it steadily on the bottom. If required, the bottom foundation can of course be attached to the bottom in some way and it may then comprise a simple fastening device having a low mass, not shown. As can be better seen in FIGS. 2a and 2b the buoy 3 and the bottom foundation—alternatively the bottom fastening device—are connected to each other by an anchor line 7, e.g. a steel wire. As an alternative, the motive force can be created in relation to some kind of movable object such as to a weight suspended in the buoy 3, see FIG. 7d.

Figure 2A:
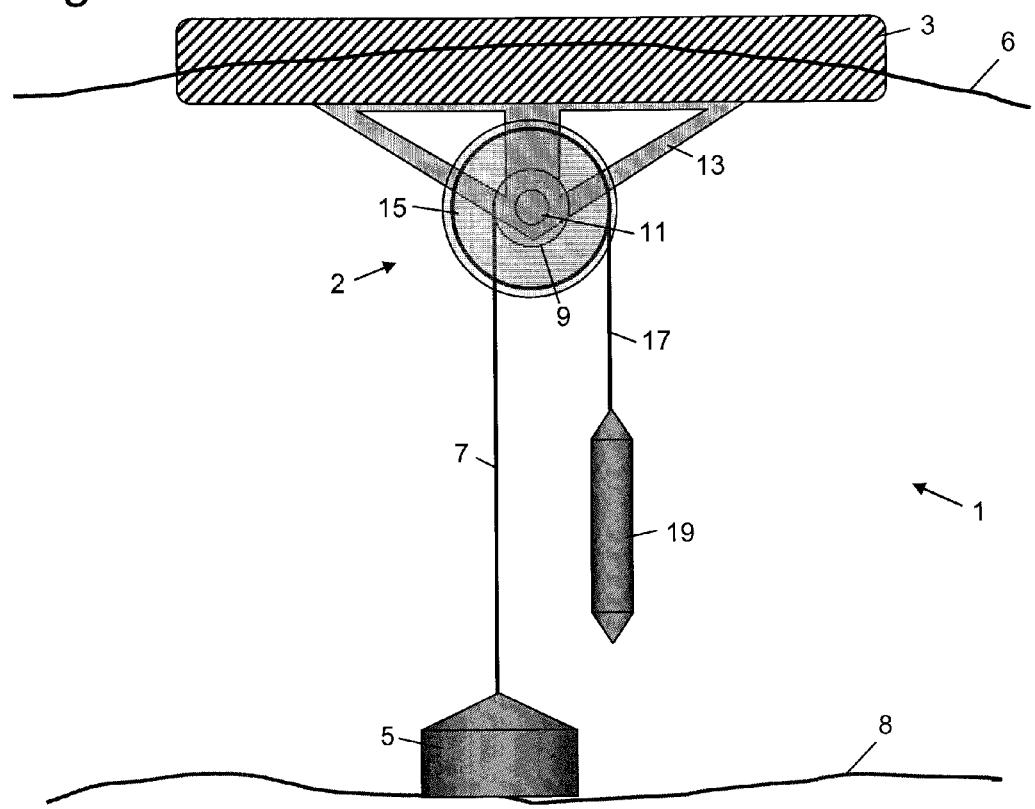
FIG. 2a is a side view of a wave power plant including a counterweight.
Figure 2B:
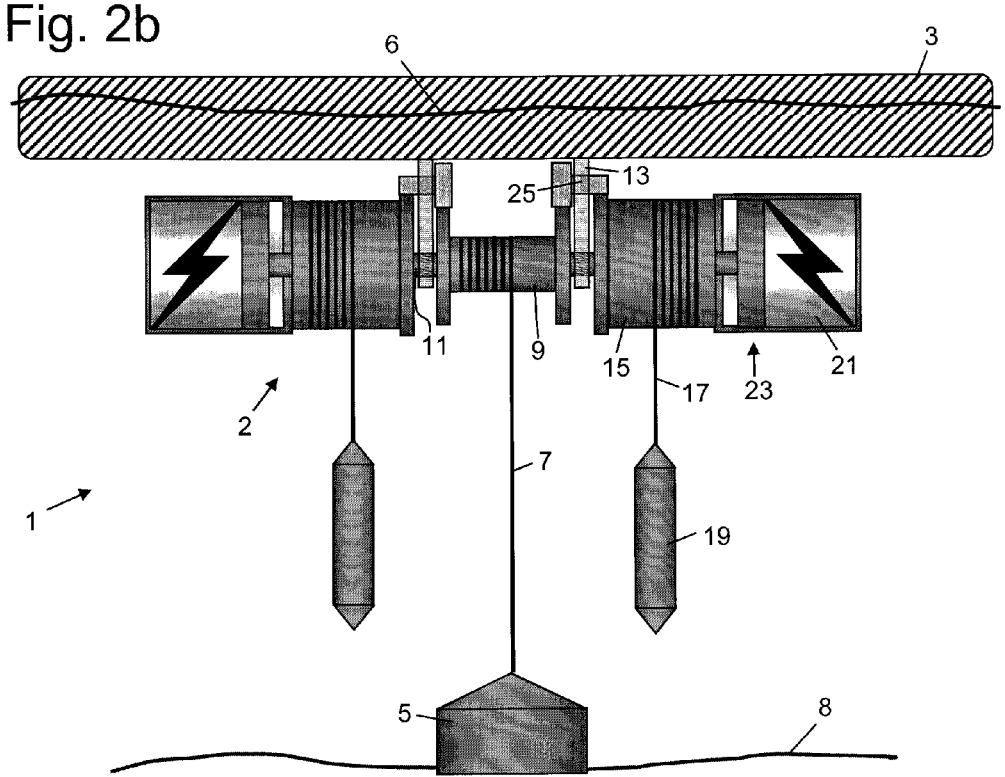
FIG. 2b is a front view of the wave power plant of FIG. 2a, FIG. 2c is a sectional view of a wave power plant having an alternative suspension of a power train.

In the shown embodiment the anchor line 7 is at one end attached to the foundation 5 and is at its opposite end attached to a power train 2 and more or less wound around a first winding drum, an anchor drum 9, included in the power train, the winding drum being mounted to rotate about a driveshaft 11. The driveshaft 11 is in a suitable way journalled for rotation at the buoy 3. As shown in FIGS. 2a and 2b the buoy can at its bottom side comprise downwards protruding support bars 13, which can be said to constitute a frame and at which the driveshaft 11 is journalled, e.g. at its two ends. On the driveshaft, in the embodiment shown in these figures, also a second winding drum, a counterweight drum 15, is arranged on which a line 17 is partly wound at its upper end. The counterweight line 7 carries at its lower end a counterweight 19. The cylindrical surface of the counterweight drum, on which the line for the counterweight is wound, has in the embodiment shown a diameter that is larger than that of the cylindrical surface of the anchor drum 9, on which the anchor line 7 from the bottom foundation 5 is wound. The first mentioned diameter can e.g. be considerably larger than the latter one, such as having a relation in the magnitude of order of 2:1 to 3:1, but it does not have to. Thus, the winding drums can have the same diameter when suitable.

Figure 2C:
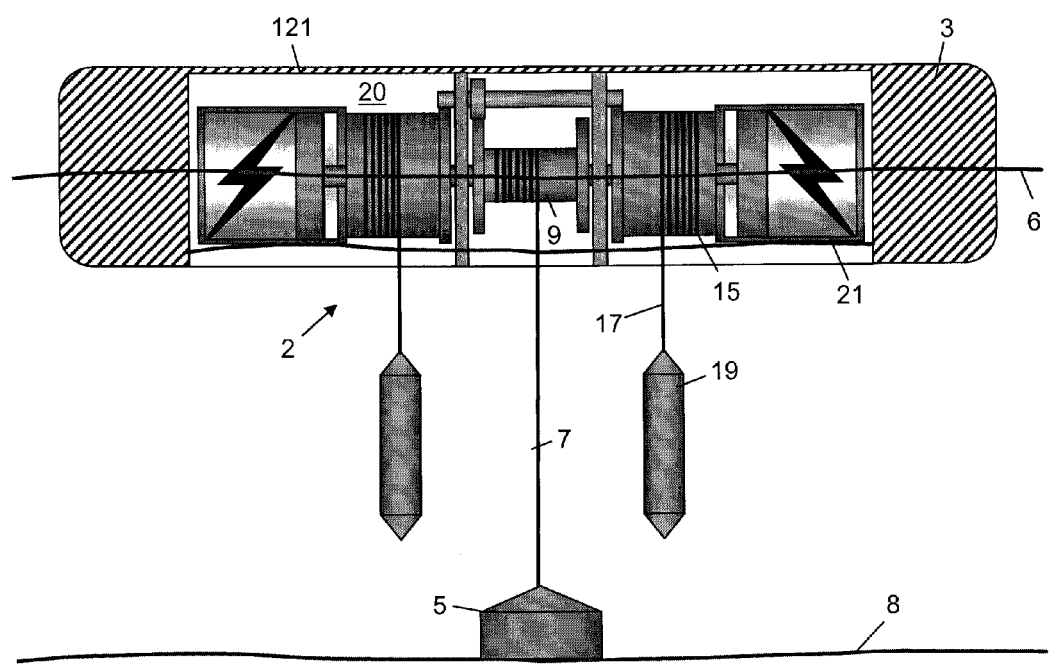
FIG. 2d is a different sectional view of the wave power plant of FIG. 2c.
FIG. 2e is a view from underneath only comprising a buoy including steering fins, an anchor drum and a counterweight drum according to FIG. 2c.
FIG. 2f is a view from underneath of the wave power plant of FIG. 2c also showing an air pump.
FIG. 2g is a top view of a power train for a wave power plant mounted in a frame.
Figure 2D:
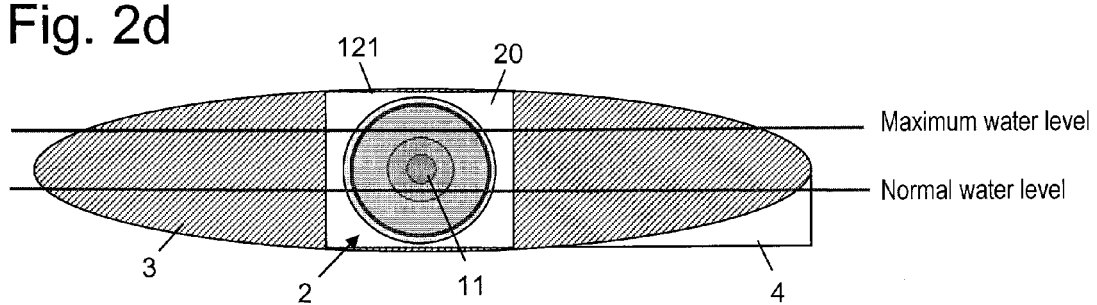
Figure 2E:
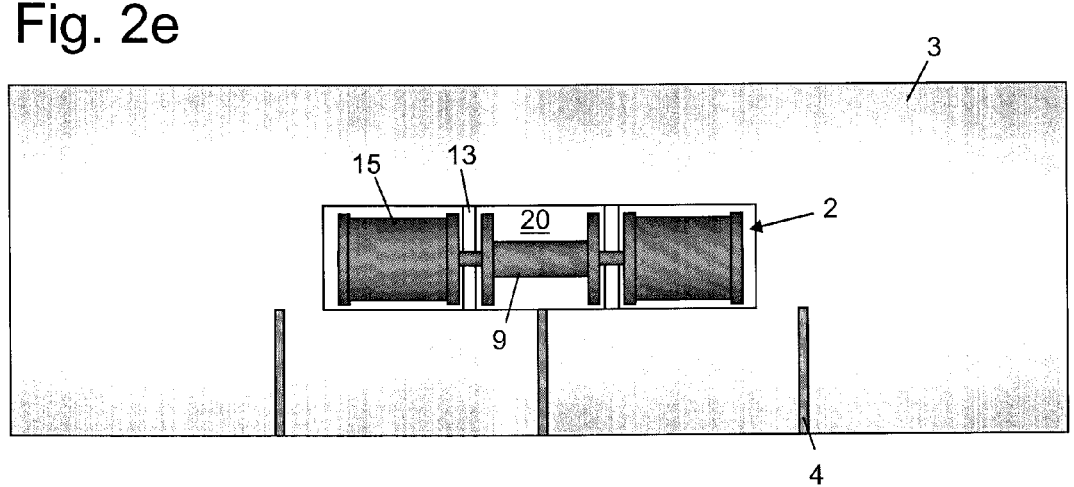

Instead of having the power train 2 mounted under the buoy 3, as shown in FIGS. 2a and 2b, the power train can be mounted in a recess in the buoy, a power train room 20, as shown in FIGS. 2c, 2d and 2e. Then, the driveshaft 11 can be mounted in a substantially central position in the buoy. The support bars 13 can be attached to walls of the power train room 20.

Thus, the anchor line 7 and the counterweight 19 are not directly connected to each other as in previously known constructions. In the previously known constructions, see the principle picture of FIG. 11a, half the motive force of the buoy 3 is accumulated in the rise of the wave by the anchor line 7 running over the anchor drum 9', so that a generator 21 for generating electric current can be driven also when the wave thereafter sinks. In the latter case, the generator is either driven in a reverse direction or the rotation movement is rectified by a mechanical or hydraulic transmission solution, not shown. However, in both cases the generator 21 is still directly driven according to the momentary vertical movement of the wave.

Instead, as appears from FIGS. 11b and 11c, the generator can be connected to be driven between the counterweight 19 and the anchor drum 9, so that e.g. a first part of the generator, not shown in these figures, typically corresponding to the inner rotating part, the rotor, of a conventionally mounted generator, on one side of the air gap of the generator, not shown, is mechanically connected to the anchor drum and a second part of the generator, not shown in these figures, typically corresponding to the outer stationary part of the generator, the stator, in a conventionally mounted generator, on the other side of the air gap, is mechanically connected to the movements of the counterweight, so that this part can also rotate. Hereby the generator 21 can be driven from two sides with a maintained relative rotation direction between its first part and its second part. When the wave and the buoy 3 are rising, the driveshaft 11 is rotated forwards by the anchor line 7, which runs around the driveshaft via the anchor drum 9 and which at its other end is anchored to the bottom 8, e.g. to a foundation 5. The counterweight 19 is used to create a resilient resisting force and thereby gives an even torque between the counterweight drum 15 and the driveshaft 11, which in that way drives the first part and second part of the generator in relation to each other. It is also possible to use other methods to achieve such a driving operation, e.g. a gas pressure or a spring for providing a constant force, as will be described below.

In FIGS. 11a, 11b, and 11c the arrows 111 show absorption of wave energy. The absorption level varies according to the momentary movement and the momentary movement direction of the wave. When the driveshaft 11 is rotated forwards by the anchor drum 9, also the generator 21 follows the rotation, so that the counterweight line 17 starts to be wound around the counter weight drum 15, which can be a part of or be rigidly attached to the second part of the generator, see the arrows 113, and so that the counterweight is moved upwards. Hereby, potential energy is stored in the counterweight at the same time as a torque over the generator (torque=weight of the counterweight*acceleration of gravity (i.e. the gravitational force acting on the counterweight)*radius of the counterweight drum) appears. The torque makes the second part of the generator start rotating in relation to the first part, the latter part being mechanically connected to the driveshaft 11, so that the counterweight line 17 starts to unwind from the counterweight drum 15, and hereby potential energy accumulated in the counterweight 19 is converted to electricity, see the arrows 115. The faster the generator parts rotate in relation to each other, the more electric power is generated, and then also a higher counteracting force is obtained in the generator 21, i.e. the electromagnetic coupling between the two parts of the generator becomes stronger. When the counterweight 19 reaches a certain velocity, the pulling force from the counterweight becomes equal to the counteracting force in the generator, this resulting in the fact that the rotation speed of the generator and the power output from the generator are stabilized in an equilibrium state.

This way of connecting and driving the generator 21 can give great advantages, since the generator can be used much more efficiently compared to what have been earlier possible. The same relative rotation direction between the generator parts is all the time maintained and the generated electric power is kept at a substantially even level, this requiring a minimum of subsequent electric treatment of the electrical voltage generated by the generator. Also, the arrangement of the generator can give advantages from a storm safety point of view, since the motive force over the generator and transmission is limited.

The structure of the transmission unit 2 and the function thereof will now be described in more detail with reference in particular to FIGS. 2a, 2b and 3a.

During the movements of the waves the distance between the buoy 3 and the bottom foundation/bottom fastening device 5 varies. The anchor drum 9 is rotated, due to the coupling with the anchor line 7, in a first direction when the water surface 6 rises, and is then locked to the driveshaft 11 which is thereby rotated by the anchor drum. When the water surface at the buoy sinks, the driveshaft is locked from rotating backwards in the opposite direction by anti-reverse mechanisms 53 arranged in the shaft support bars 13, see FIGS. 5a and 5b. To be capable of rotating the anchor drum backwards, in a second, opposite direction, thereby keeping the anchor line in a tensed state when the water level 6 at the buoy 3 sinks, a mechanism for reverse feeding of some kind is required as will be described below. The driveshaft 11 is in turn connected to the generator 21. The coupling between the driveshaft and the generator can be fixed or it can as illustrated comprise a mechanical gear 23, which e.g. has a fixed teeth relation or fixed gear ratio and which gears up the rotation speed of the generator. Thereby, one of the parts of generator that are rotatable in relation to each other, here for the sake of simplicity called rotor and stator, e.g. an inner generator rotor 21', compare FIG. 3a, is driven to rotate in the first direction. The other rotatable part of the generator, e.g. an outer stator 21", is rigidly mounted to the counterweight drum 15. The generator parts are separated by an air gap 21'''.

Due to the winding of the counterweight line 17 around the counterweight drum 15 during the forward feeding of the driveshaft 11, a relatively constant motive force or a relatively constant torque acting on the driveshaft 11 is achieved, which through the connection between the rotor 21' and the stator 21" of the generator 21 drives the generator to rotate and generate electric current. When the torque from the anchor drum 9 exceeds the counteracting torque, that is derived from the electromagnetic coupling over the air gap between the rotor and the stator of the generator, when these parts are rotating in relation to each other, more of the counterweight line 17 is wound around the counterweight drum 15 and the excess energy, to which this higher torque corresponds, is accordingly accumulated in the hoisting-up of the counterweight 19. Thereafter, when the buoy 3 starts to rise with a decreasing speed, to thereupon sink when the water surface 6 sinks, also the rotational speed of the driveshaft 11 and the rotor 21' in the first rotation direction is also reduced. When the torque from the anchor drum 9 becomes lower than the counteracting torque in the generator 21 according to the discussion above, the counterweight line 17 starts to unwind from the counterweight drum at an increasing speed, until the rotation of the driveshaft completely stops, the driveshaft being blocked from rotating in the reverse direction by an anti-reverse mechanism 53 in the driveshaft support bar 13, see FIGS. 5a and 5b, and the speed of the backward rotation of the counterweight drum is stabilized by the equilibrium state between the generator and the counterweight 19. Hence, the potential energy accumulated in the counterweight continues to drive the generator 21 also in this stage, with a corresponding, even torque as in the previous stage.

As has been mentioned above, the wave energy is absorbed from the traction force that arises between the buoy 3 and the bottom foundation/bottom fastening device 3 during the rise of the wave. The buoy 3 follows the movement of the wave and thereby moves the driveshaft 11, on which the anchor drum 9 is mounted, upwards in relation to the bottom foundation. A rotational movement is produced, driving the transmission. The vertical movement of the wave is converted to a rotational movement, the speed of which can then be geared up to be suited for driving the generator 21. The speed of the vertical movement of the wave determines the amount of energy that can be produced. The bigger wave, the faster vertical movement and the more energy can be absorbed. Different from the energy in the wave, the vertical speed of the movement does not increase with the square of the wave height, but follows a more linear pattern. But the larger the wave is, the less impact has the attenuating effect of the buoy 3, this resulting in the fact that the vertical movement and the motive force of the buoy rapidly increase when the wave height increases from a low level to level out towards the linear pattern the higher the wave becomes.

The anchor drum 9 is in a suitable way mechanically connected to the drive shaft 11. Such a mechanical coupling can include the following two functions.

1. During the rise of the wave the anchor drum 9 shall be capable of hooking on to the drive shaft 11, so that the driveshaft is rotated together with the rotational movement of the anchor drum. When the wave sinks, it shall be possible to disengage the anchor drum, so that the anchor drum can be rotated in the reverse direction. Furthermore, the driveshaft 11 shall be blocked from changing its rotation direction when the wave sinks. The driveshaft is in this manner fed forward by the anchor drum in the same rotation direction every time the wave rises, thereby rectifying the motive force absorbed from the wave movements. This makes it possible to drive the generator in a single rotation direction.

2. The absorption of wave energy can be limited by the use of a sliding clutch 55, which consequently can work as an overload protection, see FIGS. 5a, 5b and 5c. Such a sliding clutch also makes it possible to completely disengage the absorption of energy from the movements of the waves, by making the anchor drum 9 slide against the driveshaft 11, when the accumulation level reaches its upper limit, i.e. when it is not possible to wind more of the counterweight line 17 around the counterweight drum 15 without risking that the counterweight 19 comes to close to and damages the counterweight drum 15 and the buoy 3. The sliding clutch can also be used to limit the torque to which the transmission is submitted. When the wave sinks, the buoy 3 and the counterweight 19 will be retarded, which gives an increased g-force and hence an increased torque in the transmission. When the wave changes its directions and rises again, the g-force will further increase by the anchor drum 9 starting to be rotated forwards and lifting the counterweight in relation to the buoy at the same time as the buoy is lifted by the wave. For a too high load the sliding clutch slides and thereby somewhat reduces the acceleration, which in turn also reduces the torque to which the transmission is submitted.

A mechanical coupling between the anchor drum 9 and the driveshaft 11 providing these functions can be designed in different ways. Such a coupling can comprise one or more anti-reverse mechanisms and a sliding clutch as will be described below.

Thus a freewheel mechanism or an anti-reverse mechanism 51, see FIG. 5a, for coupling the driveshaft 11 to the anchor drum can be provided, which is herein called the anti-reverse mechanism of the anchor drum. In this case, the driveshaft passes through the anchor drum in an undivided state. The anti-reverse mechanism 51 of the anchor drum can be designed as a one-way bearing mounted around the driveshaft. When the buoy 3 rises, the anchor drum 9 and the driveshaft 11 are rotated as described above in the first rotation direction, by the anchor drum hooking on to the driveshaft by means of this anti-reverse mechanism 51. When the buoy 3 sinks, the anti-reverse mechanism of the anchor drum 9 is released and the anchor drum 9 can be reversed, rotating in the opposite rotation direction, to wind the anchor line 7, as will be described below, while the driveshaft 11 is blocked from rotating in the opposite rotation direction by another anti-reverse mechanism 53, which is acting between the driveshaft and the support bar 13 and which is herein called the anti-reverse mechanism of the shaft support bar. This anti-reverse mechanism can be arranged at or in the bar bearing 54 for the driveshaft 11 in the bar. In this way the driveshaft is always rotated in the first rotation direction every time the buoy 3 rises and it can never be rotated in the opposite rotation direction.

If required, the power train 2 can be designed, so that the motive force, with which the anchor drum 9 acts on the driveshaft 11, can be selectively disengaged also when rotating in the first rotation direction. This can be achieved by the fact that the anti-reverse mechanism 51 of the anchor drum can be controllable, or advantageously by a sliding clutch 55 for the anchor drum, as will be described below. Then, the driving of the driveshaft 11 can be disengaged, when the accumulation of energy reaches its maximum accumulation level, i.e. when the counter-weight 19 cannot be hoisted up any higher without risking to damage the anchor drum 15 and the buoy 9. This disengagement of the driving of the driveshaft is then stopped, when the buoy 3 again starts to sink, so that the anchor drum 9 anew rotates the driveshaft 11. Hereby, the energy absorption of the wave power plant is limited and overloading the transmission and the generator 21 can be prevented, when the average wave height exceeds the level, at which the wave power plant reaches its maximum capacity. Even though the energy absorption hereby may be temporarily out of function, the generator can be driven to produce maximum power as long as the potential energy stored in the counterweight 19 can be used. Thus, the load on the generator 21 and the transmission step 23 can be limited at the same time as a maximum power output can be maintained, as soon as a sufficient average height of the waves has been reached.

An alternative method of disengaging the driveshaft 11 from the anchor drum 9, in order to limit the energy absorption, is that both engagement and disengagement are done when the torque is transferred between the anchor drum and the driveshaft is zero. In this case a claw coupling 55" can instead be used, see FIGS. 5e and 5f. When the counterweight 19 has exceeded an upper limit, the claw coupling is disengaged as soon as the torque has decreased to zero, see FIG. 5f. The claw coupling is engaged again, see FIG. 5e, when the counterweight has reached a predetermined lower limit, as soon as the torque has decreased to zero. The upper limit must as discussed above provide a sufficient safety margin so that the counterweight 19 does not reach the counterweight drum 15 even if an extreme wave comes. Advantages of this method include that the disengagement mechanism can manage higher transferred torques, a low energy consumption only during transition states and a minimum of mechanical wear in the disengagement operation. The disadvantage is that a longer counterweight line 17 is required, which can be limiting in some cases.

The sliding clutch 55 of the anchor drum 9 can be mounted between the anti-reverse mechanism 51 of the anchor drum and the anchor drum as schematically shown in FIG. 5a. The torque transferred by the sliding clutch between the anchor drum and the drive shaft 11 can be controllable in accordance with some suitable electrical signal and in that way the maximum energy absorption level in the system can be set.

In an alternative embodiment no mechanical anti-reverse mechanism 51 of the anchor drum 51 is arranged, see FIG. 5b. The driveshaft 11 also in this case passes undivided through the anchor drum 9. Instead the sliding clutch 55 of the anchor drum is used as an anti-reverse mechanism. The sliding clutch is at one of its coupling sides rigidly mounted around the drive shaft 11 and is at its other coupling side rigidly attached to the anchor drum 9. The transfer of torque in the sliding clutch 55 is controlled to also give the function of an anti-reverse mechanism.

Figure 5C:
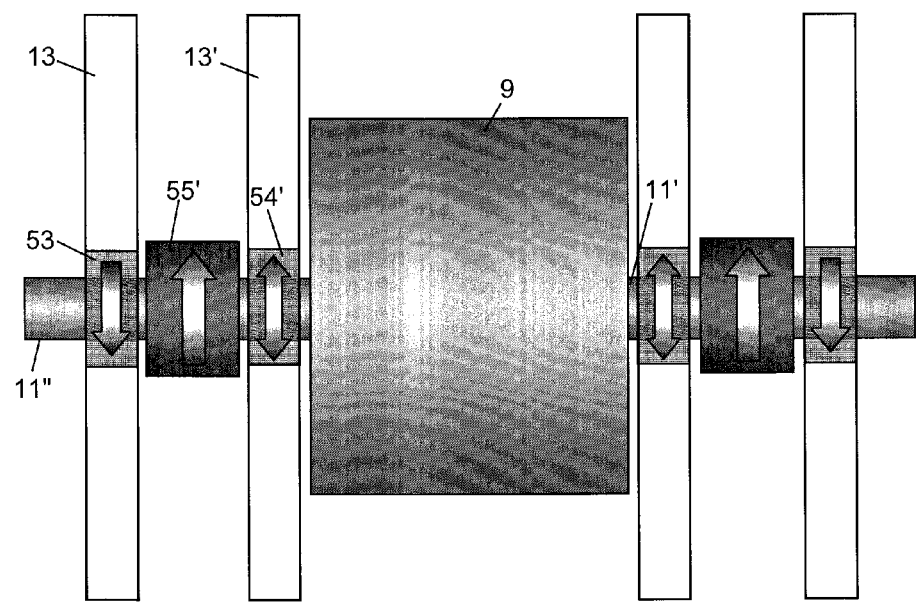
FIG. 5c is a schematic of an anchor drum including couplings designed in yet another alternative way.

In still another alternative embodiment a detached sliding clutch 55' having no mechanical anti-reverse mechanism is arranged, see FIG. 5c. The driveshaft 11 is in this case divided and the anchor drum 9 is rigidly attached to the first part 11' of the driveshaft. A sliding clutch 55' is connected between the first part 11' and the second part 11" of the driveshaft, at a side of the anchor drum. The first part 11' of the shaft is journalled in an inner shaft support bar 13' between the anchor drum and the sliding clutch at a bearing 54'. The sliding clutch 55' is as described above used as an anti-reverse mechanism and the torque transferred thereby is controlled in the same way as in the case where the sliding clutch is built into the anchor drum 9.

Figure 5D:
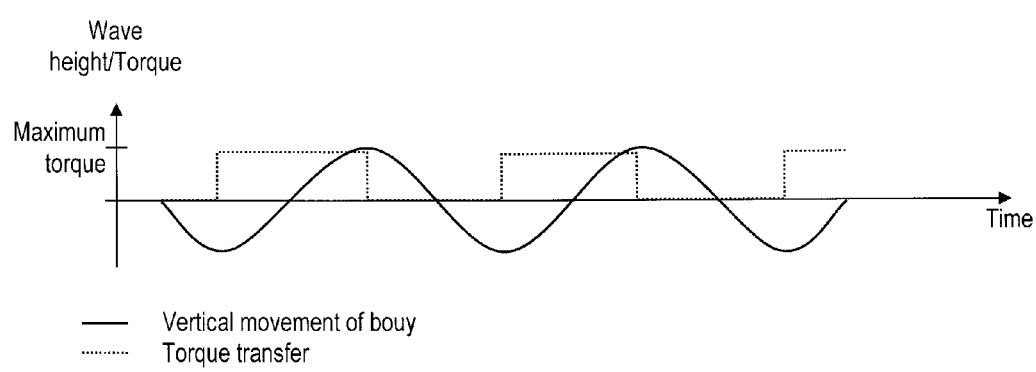
FIG. 5d is a diagram illustrating a control rule for engagement of a sliding clutch.
Figure 5E:
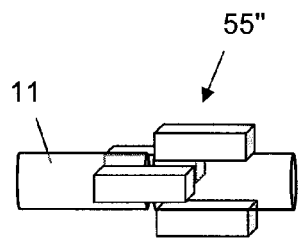
FIG. 5e is a schematic view of a claw clutch in an engaged state.
Figure 5F:
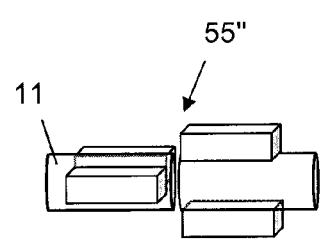
FIG. 5f is a schematic view of a claw clutch in a disengaged state.

In the case where the sliding clutch 55, 55' is used as an anti-reverse mechanism, it can be controlled as illustrated in FIG. 5d. Then, it alternates between transferring full torque and no torque at all. The anchor drum 9 rotates forwards while the wave is rising, and is thereafter fed backwards by the reverse feeding mechanism described below, when the wave is sinking. Hence, the alternation in torque transfer occurs when the rotation direction of the anchor drum is changed.

Figure 6:
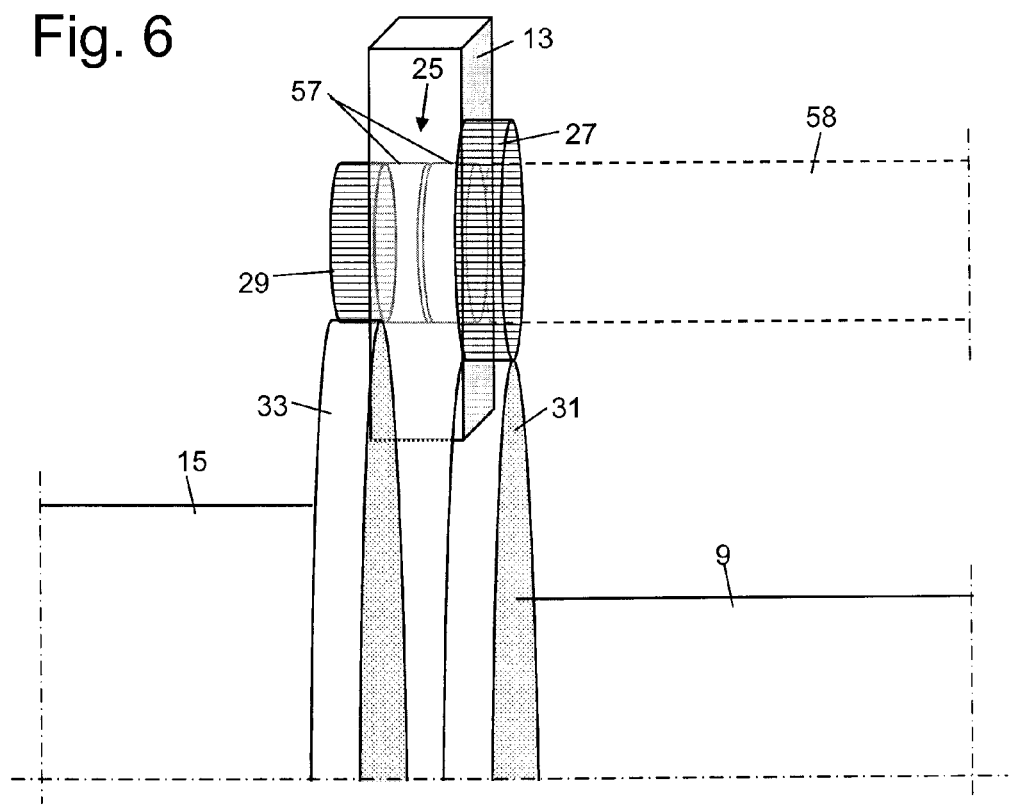
FIG. 6 is a detail view of a mechanical coupling for reverse feeding between an anchor drum and a counterweight drum.

The rotation of the anchor drum 9 and the rotation of the counterweight drum 15 can also be interconnected by a mechanical coupling, the above mentioned mechanism for reverse feeding, in addition to the electromagnetic coupling through the generator 21. It can be achieved by using, among other things, a second sliding clutch 25, here called the sliding clutch for reverse feeding, see FIG. 6, which is used for controlling the magnitude of the torque, which is to be transferred from the counterweight drum to the anchor drum. The magnitude of this torque can also be adjustable and controllable. Also, this torque can be used to rotate the anchor drum 9 in the reverse direction, thereby securing that the anchor line 7 extending to the bottom foundation 5 is kept in a tensed state while the buoy 3 is sinking. The torque can also be used to counteract the drift of the buoy away from the bottom foundation due to water currents and wind at the water surface 6.

Figure 15A:
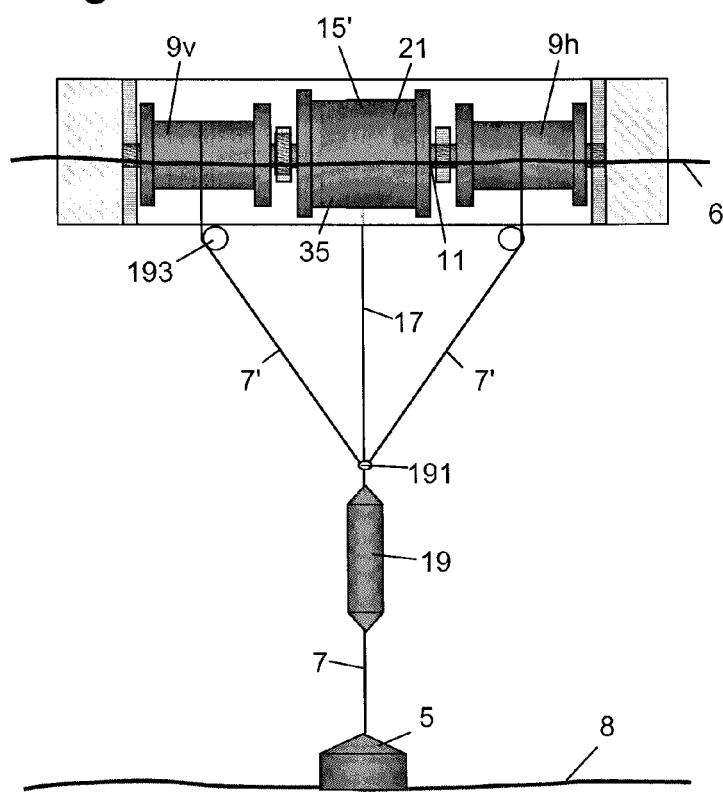
FIG. 15a is a front view of a wave power plant having an alternative design of a power train including only one generator, the stator of which rotates together with the counterweight drum, one counterweight and an alternative guide mechanism for an anchor line.
Figure 15B:
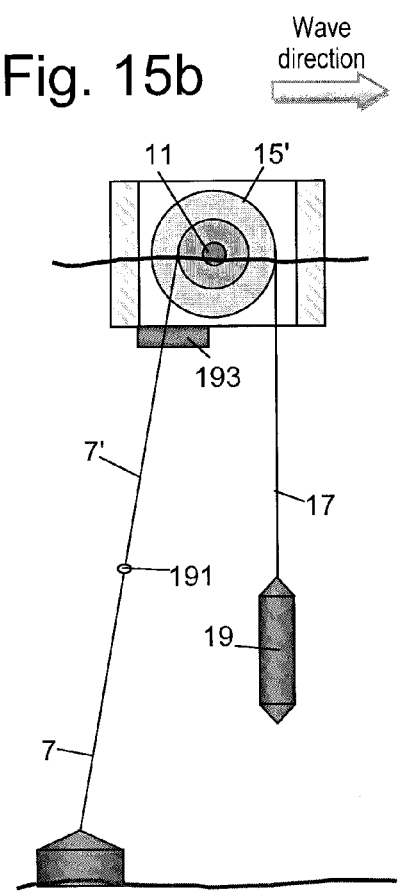
FIG. 15b is a side view of the wave power plant of FIG. 15a, FIG. 15c is a front view of a wave power plant according to FIG. 15a having a different type of divided anchor line.
Figure 15E:
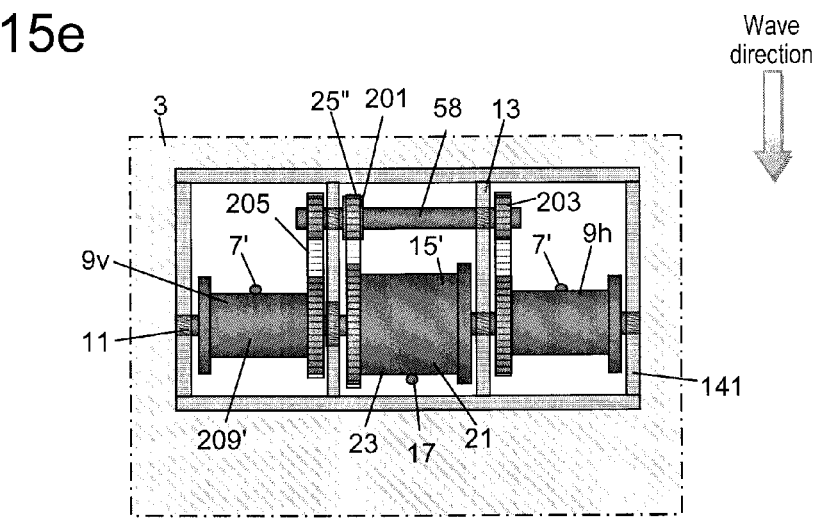
FIG. 15e is a bottom view of the power train of the wave power plant of FIG. 15a, FIG. 15f is a bottom view similar to FIG. 15e but including a power train in which the stator of the generator is rigidly attached to the buoy.
Figure 15F:
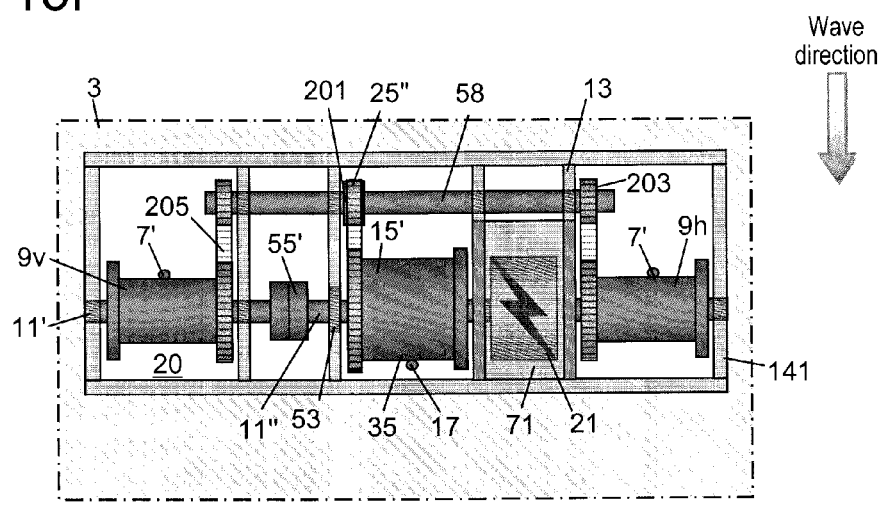
FIG. 15d is a side view of the wave power plant of FIG. 15c.
FIG. 15g is a bottom view of a power train similar to FIG. 15f in which the mechanical components are encapsulated to a larger extent.
FIG. 15h is a front view of the power train of FIG. 15g.
FIG. 15i is a view similar to FIG. 15g, in which a mechanism for reverse feeding in the power train is driven by an electric motor.

The sliding clutch 25 for reverse feeding can as shown be mounted in one of the support bars 13, in which the driveshaft 11 is rotationally supported. Gearwheels 27, 29 run against the edges 31, 33 of the winding drums 9 and 15, respectively, and these edges can then in the corresponding way be toothed. The gearwheels 27 and 29 are connected to the input and output shafts of the sliding clutch 25 and their sizes in relation to the gearwheels 31, 33 at each respective winding drum are adapted to provide sufficiently high gear ratios for the rotation speed of the anchor drum 9 to be sufficient to wind the anchor line 7 fast enough to keep it tense, when the buoy 3 is sinking with its highest velocity. In the embodiment shown the gearwheels 27, 29 are arranged to rotate coaxially and are directly connected to the two clutch disks 57 in the sliding clutch 25 for reverse feeding, which disks are pressed against each other with a controllable force, so that when required, a torque of a desired magnitude can be transferred between the counterweight drum 15 and the anchor drum 9. An alternative is to instead rotate the anchor drum in the reverse direction using an electric motor in the corresponding way as shown in FIG. 15*i*.

The gear 23 connecting the driveshaft 11 to the generator 21 can give a stepped up rotational speed of the driveshaft so that the generator obtains a higher rotational speed, this allowing the use of a high speed generator. Since the power output from the generator is proportional to the mass of the rotor 21' and the stator 21" thereof and to the rotational speed of the generator, this is of a very high importance. Furthermore, the gear 23 can generally be or include a variable gear and in that case it can for example comprise a gear having a fixed gear ratio such as a planetary gear 35, arranged as an input stage, see FIG. 12*e*. Then, the output shaft of the planetary gear is connected to the input shaft of a variable gear 37 (CVT), the output shaft of which is connected to the first one of the parts of the generator such as the rotor 21' thereof. The stator 21" of the generator and the casings of these gears are rigidly attached to each other and to the counterweight drum 15 and can rotate freely as one unit around the driveshaft 11. The gear ratio between the driveshaft 11 and the first part 21' of the generator is in this case given by the product of the gear ratio of the planetary gear 35 and the gear ratio of the variable gear 37.

The maximum rotational speed that the generator 21 can handle depends on the choice of generator. A suitable range for the nominal rotational speed of the generator is about 1500 to 3000 rpm depending on the maximum capacity for which the wave power plant 1 is dimensioned. To gear up the generator to such a rotational speed a gear ratio in the range of about 100 to 200 times is required, the gear ratio also being dependent on the radius of the anchor drum and on the average motion speed of the movements of the buoy for which full power shall be reached. When the rotational speed is stepped up, the torque is at the same time stepped down with the same ratio, this bringing about very high input torques for the gear 23. Also, a high gear ratio can cause high transmission losses. A planetary gear 35 as described above provides a high fixed gear ratio, can manage very high input torques and has a good efficiency. The variable gear stage in the gear 37 can be used to adapt the revolution speed of the generator according to the current average height of the waves. Such a variable gear can e.g. be a stepless variable gearbox or a hydraulic gearbox.

Alternatively, the power train 2 can be designed to include other ways of accumulation of energy from the rise of the water surface 6, e.g. as elastically stored energy. Then, a counterweight is not required and can e.g. be replaced with a spring, typically a coil spring 69, see FIG. 3*b*. The inner end of such a coil spring is then attached to the support bar 13, whereas the outer end thereof is attached to the casing of the gear 23 and thereby is coupled with the generator 21, to the second part thereof. Energy can also be accumulated as a gas pressure as will be described below.

In the embodiments described so far a single anchor drum 9 and two counterweight drums 15 located on either sides of the anchor drum can be arranged as shown in the corresponding figures. One gear unit 23 and one generator 21 are associated with each counterweight drum. Thus, a counterweight drum 15 is connected to each end of the driveshaft 11, i.e. the driveshaft is mounted between the two counterweight drums and the driveshaft is rotationally supported in the support bars or the frame 13.

Figure 2F:
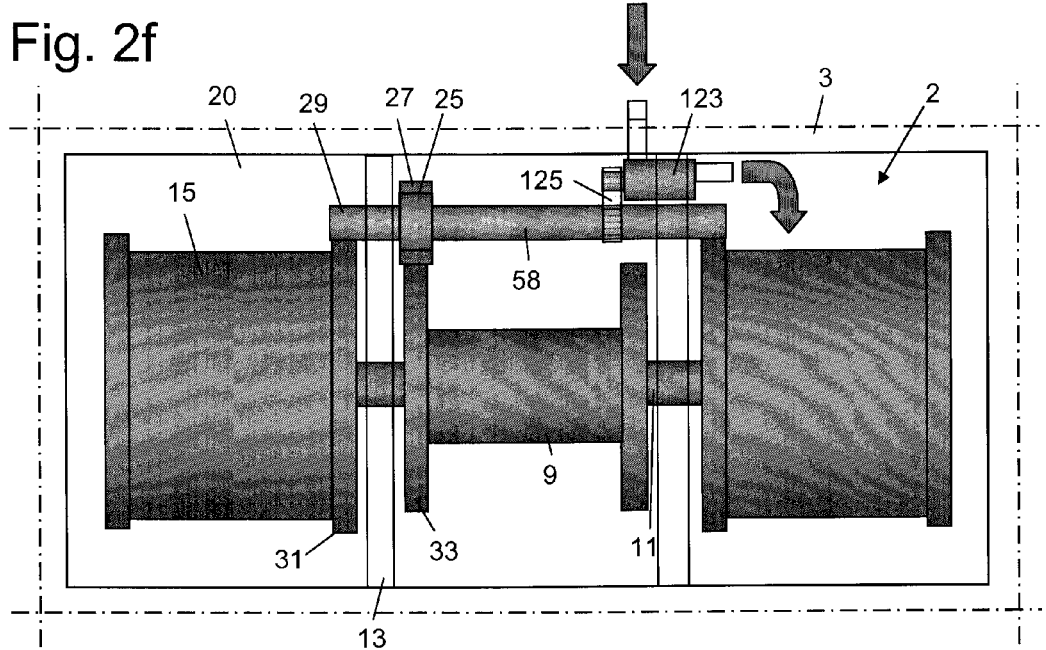

The movements of the two counterweight drums 15 can be synchronized using a link shaft 58 that is journalled in the support bar parts 13 and has gearwheels 29 at its two ends, the gearwheels cooperating with the toothed wheel rims on the flanges 33 of the counterweight drums, see FIG. 2*f*. The generator assemblies 21 are independent but the counterweights 19 must be kept on the same horizontal level so that the distance between the counterweight and the anchor drum is the same in both assemblies. Otherwise the centre of gravity in the wave power plant 1 can be displaced, so that the energy plant can turn in an inappropriate manner against the waves having as a consequence a deteriorated capture ratio between the waves and the buoy 3. The link shaft 58 is in the embodiment shown also used for achieving reverse feeding from the counterweight drums 15 to the anchor drum 9. Therefor, it also has a gearwheel 27 cooperating with a gear ring on one flange 33 of the anchor drum in a way similar to the mechanism for reverse feeding shown in FIG. 6.

Since the link shaft 58 is made in one piece and in order to be capable of rigidly interconnecting the rotational movements of the counterweight drums 15, another type of sliding clutch for reverse feeding must be used. The sliding clutch 25' for reverse feeding is in this case located between the larger gearwheel 27 which cooperates with the flange 31 of the anchor drums 9, and the through-going link shaft 58, to which the gearwheels are rigidly mounted. Instead of a drive using cooperating gearwheels as shown in the figures, a belt-drive or chain-drive can for example be used.

The support bar 13 includes in the embodiments of FIGS. 2*a*-2*b* two support bar parts protruding from the underside of the buoy 3, each of which includes a bearing 54 having an anti-reverse mechanism 53 for the driveshaft 11, compare also FIGS. 5*a* and 5*b*. Such a construction of the power train 2 including an anchor drum 9 arranged centrally on the driveshaft and counterweight drums 15 that together with associated gears 23 and generators 21 are arranged on both sides thereof, gives a symmetrical weight acting on the buoy and also a more symmetrical load due to currents in the water compared to the case where only one counterweight drum together with associated generator and counterweight 19 is used, the counterweight drum being connected to one end of the driveshaft 11.

Figure 2G:
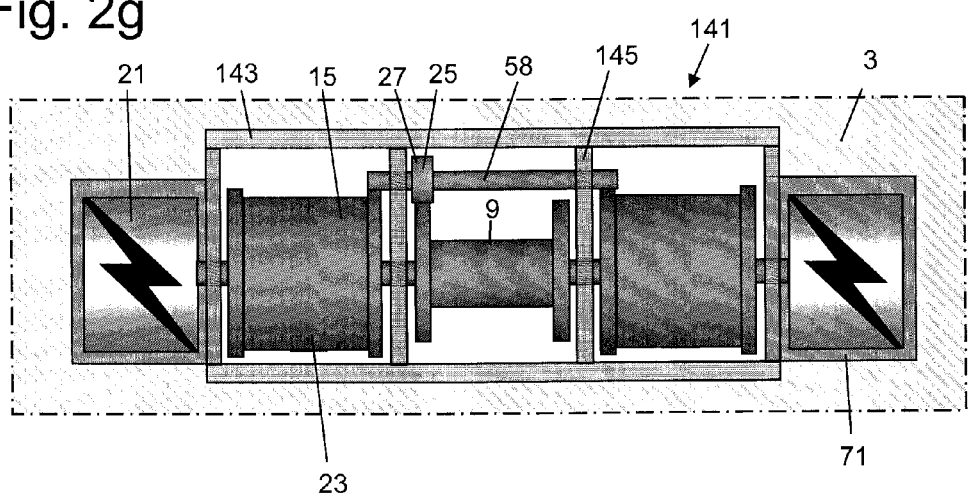

As an alternative, the power train 2 including the anchor drum 9, the driveshaft 11, the counterweight drums 15, the gear units 23 and the generators 21 can be carried by a support structure or driveshaft frame 141 as shown in FIG. 2*g*. The support structure includes a surrounding frame-shaped part 143 and a number of shaft support bars 145 which extend between the long, opposite sides of the frame part and which correspond to the support bars or bar parts 13 described above. The shafts of the power train are journalled in the shaft support bars. The number of shaft support bars is dependent on different design alternatives. The frame 141 is secured to the buoy 3.

In the case where a planetary gear 35 is used, a somewhat different embodiment is possible. A planetary gear is composed of a planet carrier 161, at which a number of planet gears 163 are journalled along a circle inside a gear ring 165 and around a sun gear 167 with which the planet gears are in gear wheel engagement, see FIG. 12*a*. When the planet carrier rotates and the outer wheel, the gear ring, is stationary, the planet holder drives the inner wheel, the sun gear, to rotate, this stepping up the rotation speed. Alternatively the sun gear 167 can be driven by the rotation of the gear ring 165 while the planet holder 161 is kept in a fixed position, this also stepping up the rotation speed. As mentioned above, it can be utilized, so that the planetary gear 35 and the generator 21 e.g. are placed inside the counterweight drum 15 and primarily so that both the gear ring 165 of the planetary gear and the generator stator 21" are rigidly connected to the counterweight drum, compare e.g. FIG. 2*b*.

Alternatively, only the planetary gear 35 can be placed inside the counterweight drum 15 having its gear ring 165 rigidly attached to the counterweight drum. Then, the generator stator 21" is instead rigidly attached to the buoy 3 such as to the frame 141, see FIG. 2*g* and also FIG. 3*d*. The drive shaft 11 is journalled and can rotate freely both at its entrance and exit of the counterweight drum. The load on the shaft given by the counterweight 19 is taken up by the driveshaft which is carried by the shaft support bars 145 in the driveshaft frame 141. Thus, the planetary gear 35 is exposed to a low shaft load. The system function remains the same but such a design can simplify the electrical connection and encapsulation of the generator 21 and also simplify the access for service and maintenance. The inertia can also be reduced, i.e. the total angular momentum, by the fact that the stator 21" in this case does not have to rotate, which can be of some importance. Also other types of gearboxes can be used in a similar way, e.g. the casing or the cover of the gearbox then being rigidly connected to the counterweight drum 15. In this case, the gear ring of a planetary gear corresponds to the house or casing of the gearbox.

Figure 12A:
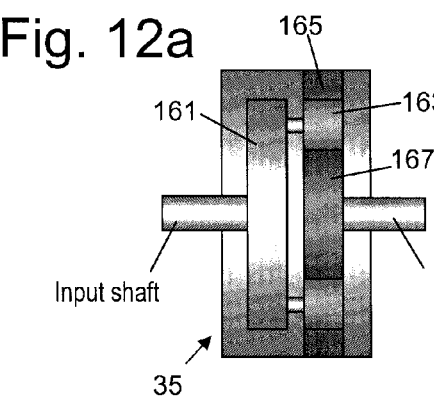
FIGS. 12c and 12d are schematic views, illustrating the construction of a variable mechanical gear (CVT/CVET)
FIG. 12e is a view of a planetary gear and a variable gear coupled with a generator in a power train.
Figure 12B:
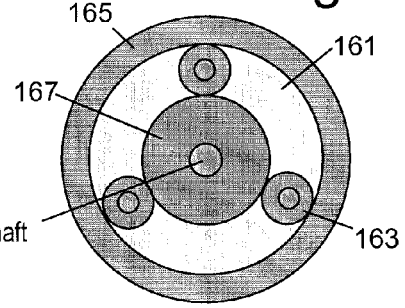

The gear ratio in a planetary gear is given by the difference between the number of teeth on the planet gear and the sun gear. In FIG. 12*a* a planetary gear is shown having one gear step but it is possible to add a plurality of gear steps. It can then be done according to the principle that two or more planetary gears are coupled with each other having their ring gears rigidly attached to each other. Up to three steps are commonly used, this giving relatively low transmission losses. Every step is usually chosen to have a gear ratio between 5 and 10, which for three steps gives a gear ratio up to 300. The higher power for which the wave power plant 1 is dimensioned, the larger diameter of the anchor drum 9 is required, due to the fact that the anchor line 7 requires a larger diameter for larger dimensions. An increased diameter of the anchor drum results in a lower rotation speed in relation to the vertical movement of the wave, this resulting in the fact that a wave power plant having a larger capacity requires a higher gear ratio to achieve the corresponding rotational speed in the generator 21.

In FIGS. 11*d* and 11*e* it is in the same way as in FIGS. 11*b* and 11*c* schematically illustrated how the driving of the generator 21 can be achieved for a generator having a stator rigidly attached to the buoy 3.

The buoy 3 will, when the waves are moving, in addition to be moving vertically, also always change its angular orientation around a completely horizontal position, which is taken at a completely calm water surface. Then, the driveshaft 11 also is rocking sideways all the time, which can make the anchor line 7 and the counterweight line/lines 17 slide and rub against each other on the anchor drum 9 and the counterweight drum/drums 15. A track guiding mechanism can then be used, which brings about that the respective lines are wound in a regular way. A possibility is to use helicoidal grooves 39, 41, 43, 45 on the cylindrical winding surfaces of the drums 9, 15, see FIG. 3*c*. In the case where two counterweight drums are utilized, the direction of their helicoidal grooves can be opposite, i.e. one of the helicoidal grooves 39, 41 is right handed while the other helicoidal groove 43, 45 is left handed, to maintain to some extent a symmetrical load on the wave power plant 1 due to the pulling force from the counterweights 19 and the anchor line 7.

Helicoidal grooves according to 39, 41, 43 and 45 having a shape that follows the profile of the lines can also significantly increase the life-time of the lines due to the fact that the contact surface between line and respective winding drum is increased.

If only one anchor line 7 is used, the point where this line acts on the anchor drum 9 is axially displaced, when the line is more or less is wound and unwound. To achieve a more symmetrical load in the case of two counterweight drums 15 the anchor line 7' can extend along a loop, so that it runs from one side of the anchor drum in helicoidal grooves 41, down to the bottom foundation 5 and via a pulley 40, which is rotationally mounted in the bottom foundation 5, back up again to the other side of the anchor drum via helicoidal grooves 43. The anchor line is then in both its ends more or less wound on the winding surface of the anchor drum within two different segments of helicoidal grooves 41 and 43 having helicoidal grooves in opposite directions. It is also possible to divide the anchor line by a Y-coupling located a distance under the wave power plant, see FIG. 15*a* and the description below.

As will be described below, two anchor drums 9*v*, 9*h* can be arranged on either side of a centrally located counterweight drum 15. Then, helicoidal grooves for the respective line 7, 17 can be arranged in a way corresponding to that shown in FIG. 3*c*. The counterweight drum can then have two segments of helicoidal grooves having opposite directions whereas the anchor drums have helicoidal grooves having opposite directions, not shown.

Figure 13A:
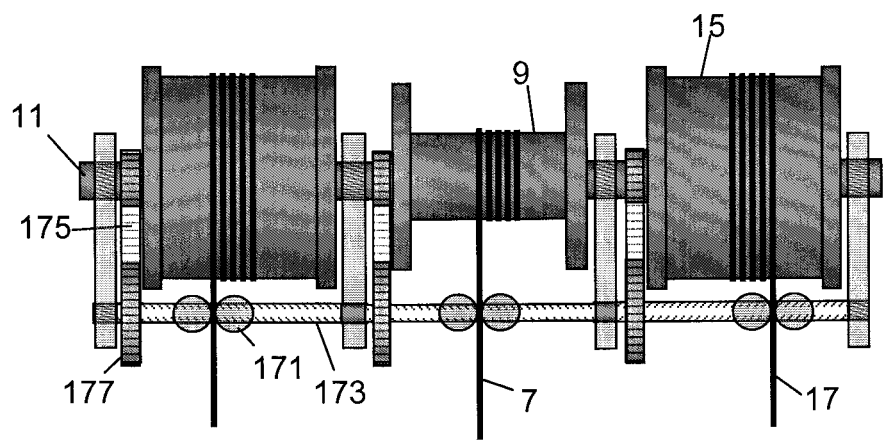
FIG. 13a is a front view of a power train having steering rollers for guiding lines.
Figure 13B:
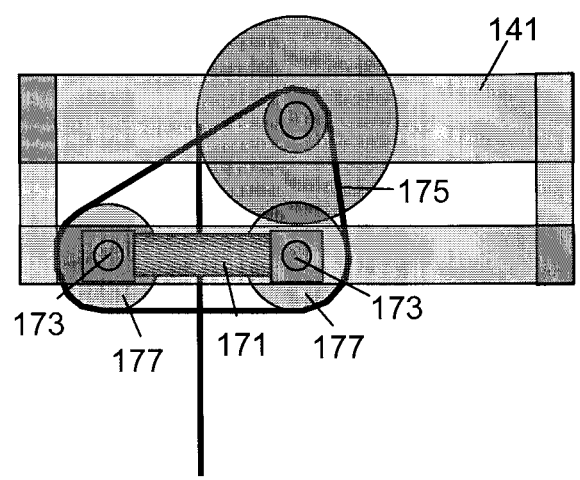
FIG. 13b is a side view of the power train of FIG. 13a, FIG. 13c is a bottom view of the power train of FIG. 13a, FIG. 14 is a bottom view of a power train including only one generator mounted in a buoy.
Figure 13C:
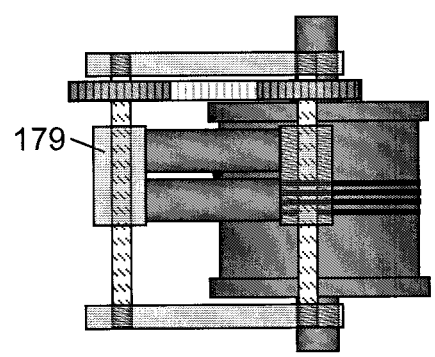

As an alternative or a complement to the helicoidal grooves on the winding drums 9, 15 guide rollers 171 can be used to guide both the counterweight lines 17 and the anchor line 7 around the respective winding drum, see FIGS. 13*a*, 13*b* and 13*c*. The guide rollers are driven by threaded rods 173, which are rotated in pace with the drums. The threaded rods for the respective counterweight drum 15 have screw threads in opposite directions as seen in FIG. 13*a*, so that the counterweight lines 17 is guided in opposite directions to each other, this being important for the centre of gravity of the wave power plant to remain centred.

Two threaded rods 171 are used for each winding drum 9, 15 and these two rods are rotated by a common toothed belt or chain 175 running over belt pulleys or chain wheels 177. The ends of the guide rollers 171 are connected to end pieces 179, through which the threaded rods pass and which guide the guide rollers along the threaded rods. The guide rollers are journalled in the end pieces and can rotate along together with the respective line 7, 17 to minimize friction and wear. The ends of the threaded rods 173 are journalled in the driveshaft frame 141.

Yet another alternative to achieve a safe winding is to use trawl drums, not shown, as is known from the fishing industry.

To minimize the risk that the counterweights 19, in the case where two counterweights are used, and their lines 17 become entangled with each other, the counterweights can be mechanically interconnected by some suitable stiff mechanical structure which holds them physically separated from each other. For example, a counterweight frame 151 can be used, see FIGS. 3e and 3f. The counterweight frame can be designed so that it does not rub against the anchor line 7 and also prevents entanglement therewith, e.g. having a rectangular, quadratic or rhombic shape according to FIG. 3f or having the shape of a closed curve, such as a round curve, not shown.

Generally, the buoy 3 can have the shape of a plate which may be elongated. Such an elongated plate can then in a convenient way be positioned, so that it most frequently has its longer side directed towards the wave direction. The width of the buoy 3 can be adapted to the average wave length of the waves at the sea surface, so that the buoy has a larger width for larger average wave lengths. Different methods can be used to stabilize the position of the buoy in relation to the direction of the waves. The rotating movements of the water particles through the waves in combination with the traction force towards the centre above the foundation 5 can be utilized by mounting fins, see FIGS. 2d and 2e, on the underside of the buoy 3. Furthermore, the shape of the buoy can be adapted. The driveshaft 11 can instead of being placed centrally under the buoy as shown in FIGS. 2a and 2b, in parallel with the longitudinal direction of the plate, be somewhat displaced in a direction towards the waves.

For the mounting of the transmission unit 2 inside the buoy 3, as shown in FIGS. 2c, 2d and 2e, the buoy must have such a size that it can accommodate the power train. As seen from the side, in parallel with the driveshaft 11, the buoy can in this case have the shape of an ellipse, i.e. generally be an elliptic cylinder. It can have a relatively large sectional area against the water surface 6 at the same time as it can be pulled against the wave direction with a smaller water resistance compared to a completely rectangular section area [S1]. The buoy 3 can have one or more fins 4 in its rear part, seen in the wave direction, which can contribute to steering the buoy straight against the direction of the waves.

The power train 2 can in this embodiment be mounted in the power train room 20, so that the power train in whole or partly can be located in a dry environment and thereby be protected against fouling and corrosion and also simpler and cheaper sealing solutions can be used, see FIGS. 2c, 2d, 2e and 2f. When the transmission unit space 20 is drained, it also contributes with its buoyancy to the buoyancy of the buoy 3. The power train room can for this purpose, at its top portion, be sealed by a cover or a service hatch 121, so that the power train room forms an air pocket. To create and maintain the drainage of the power train room 20 an air pump 123 can be used. The air pump can be driven by the link shaft 58, e.g. through a belt 125, and pump air into the power train room, this making the water level to be pressed down, so that the power train 2 is brought to a dry state and the desired air pocket is obtained. The air pump 123 can be mounted at one of the shaft support bars 145 in which the driveshaft 11 is journalled. The air pump 123 can alternatively be driven by an electric motor, not shown.

When the wave power plant is taken into operation, the service hatch 121 over the power train 2 is closed and the water level in the transmission unit space 20 is pressed down by the air pressure produced by the air pump 123. The water level outside varies during the wave period corresponding to the motive force between the bottom foundation 5 and the wave and also the inertia of counterweight 19 and buoy 3. For servicing, first of all the anchor drum 9 is disconnected, then the pressure in the power trains room is levelled to the ambient air pressure, so that the water level rises, and thereafter the service hatch 121 can be opened and service be performed. For an appropriate dimensioning and since the motive force from the foundation 5 is disconnected, the water level can be set just below the driveshaft 11, so that sealings and air pump 123 never get under the water surface 6.

Figure 15G:
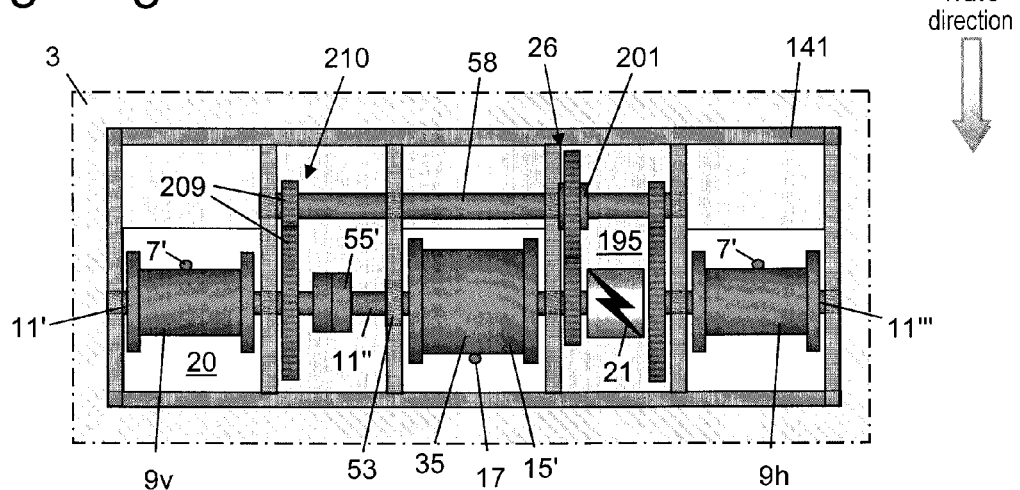
Figure 15H:
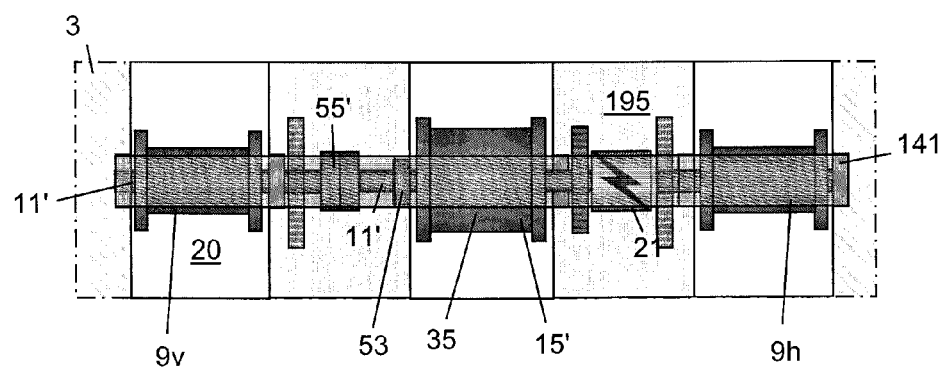
Figure 15I:
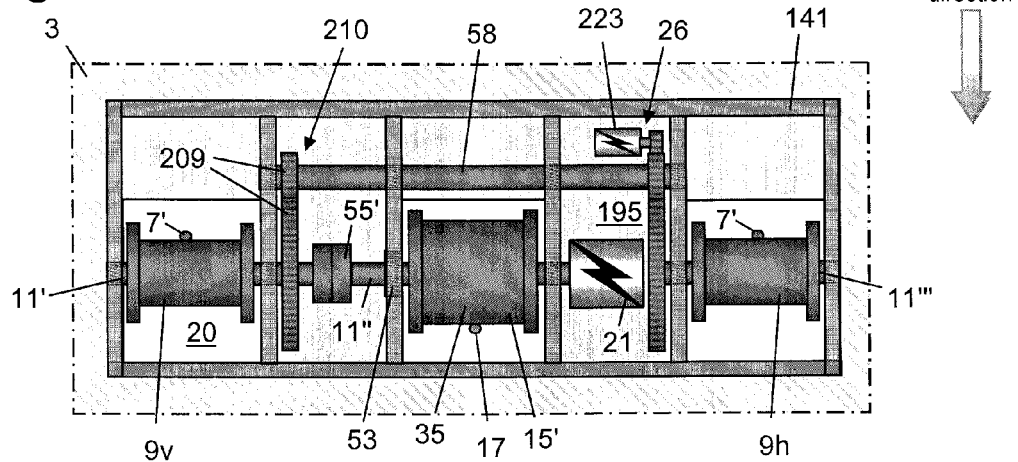

For major service the complete driveshaft frame 141 together with components included therein can, as shown in FIGS. 15g, 15h and 15i, be lifted out and replaced with a replacement power train. The counterweight 19 can be hitched under the buoy 3 while the exchange is being performed. Service of the transmission, generator and electronic circuits of the wave power plant can then be performed ashore.

In this embodiment where the transmission unit 2 and the driveshaft 11 are placed centrally in the buoy 3 the angular rotation of the buoy can be more efficiently used. The buoy actually follows the water surface, this giving an angular rotation at troughs and crests of waves [S2]. When the wave rises, the driveshaft 11 rotates and its coupling with the shaft support bars 145 is then disengaged, so that the buoy 3 can rotate backwards with the waterline of the waves without affecting the driving. When the waves turns downwards, the driveshaft is locked against the shaft support bars, which causes the driveshaft to rotate forwards in pace with the buoy following the angular rotation of the wave. This in turn makes the counterweight drum 15 rotate in a forward direction, acting to accumulate energy in the counterweight 19 in the same way as during the vertical movement in the up-going direction. The larger diameter the anchor drum 9 has, the lower input rotation speed the system gets in relation to the vertical movement, whereas the rotation speed from the angular rotation is the same irrespective of the diameter of the anchor drum. In that way, the wave power plant 1 can be dimensioned to have a larger anchor drum 9 to obtain an enhanced effect from the angle rotation in relation to the motive force obtained from the vertical movement but must then also have a sufficiently large width to withstand the torque which is accordingly increased and which is transferred to the buoy 3 from the counterweight 19, when the driveshaft 11 is locked to the shaft support bars 145.

The function of the wave power plant 1 is advantageously controlled by a computerized control system, not shown, that in particular controls the level of the counterweight span and compensates for varying accelerations and retardations of the counterweight in order to achieve a power level that is as equalized as possible in relation to the current wave climate. The control system can also be used to control the torque transfer in the sliding clutch 55, 55' of the anchor drum and the sliding clutch 25, 25 for reverse feeding, for control of locking mechanisms, not shown, to control the hitching of counterweight 19 and the bottom foundation 5 to the driveshaft frame 141 for transport and for service, and also logging of the system function and wave data. The control system is supplied with energy from an electrochemical battery, not shown, which is continuously charged by the generator 21.

The control system controls the level of the counterweight span and monitors the operation of the wave power plant 1 using sensors, not shown, particularly for sensing rotation angles/speeds of the rotatable parts, the electrical power output from the generator 21 and the movements of the buoy 3.

The control system can control the span level of the counterweight by analysing data from a sensor, not shown, that is mounted in the counterweight drum 15 and continuously informs the system about the angle which it has in relation to the gravitational direction or the shaft support bar 13. The control system can by this information keep track of the position and direction changing points of the counterweight 19 by calculating the revolution at which the counterweight is and exactly where it changes its movement direction. The movement changing points for each individual wave period are logged. An algorithm calculates if the counterweight span has a tendency to drift upwards or downwards by analysing the direction changing points during a time period. If the counterweight span is drifting upwards, the counterweight 19 can be lowered more rapidly, this resulting in a higher power output generated by the generator 21, and vice versa. The length of the time period is determined by the accumulation capacity, i.e. the length of the counterweight line 17. The higher capacity, the longer time period can be used in the calculation, which in turns gives smaller adjustments of the power output from the generator.

Two sensors, not shown, measure the electrical power output and the rotation speed of the generator 21. These values are recalculated by the control system to show the torque level applied over the generator. The control system uses the torque value to compensate for the g-force of the counterweight 19, which varies due to the inertia and influence from the acceleration force of the counterweight and influence from the water resistance that appears due to the movements of the buoy 3 in combination with variations of the rotation speed of the driveshaft 11. During a wave trough, the counterweight 19 is accelerated in a direction away from the gravitational direction, this giving an increased g-force, and during a wave crest the counterweight is accelerated in a direction back to the gravitational direction, this giving a lower g-force. By controlling the falling velocity of counterweight in accordance with the varying torque applied over the generator 21, the power level can be stabilized.

As appears from the discussion, in order not to allow that the direction changing points of the counterweight 19 drift to the end positions of the counterweight, the falling velocity of the counterweight, i.e. the average rotation speed of the counterweight drum 15, must be balanced with respect to the rotation speed of the driveshaft 11. When the average point of changing direction is moved downwards, the falling velocity of the counterweight must be reduced, this resulting in a reduced power output from the generator 21 and vice versa. By controlling the falling velocity of the counterweight and thereby the level of the counterweight span the power output from the generator can be kept as even as possible in relation to the average energy level of the current wave climate.

A control of the level of the counterweight span can be achieved in different ways. Probably, controlling the electrical load of the generator is the simplest and most cost efficient way but also other possibilities exist as will be described below.

Figure 16A:
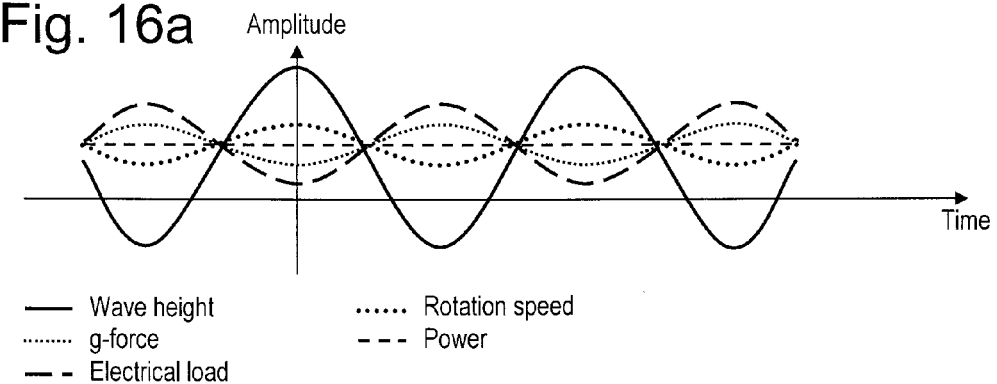
FIG. 16a is a diagram illustrating a control rule for compensating, using the load of the generator, for varying accelerations and decelerations of a counterweight.

The mechanical resistance in the generator 21 depends on the electrical load applied over the poles of the generator. When the electrical load is increased, the electromagnetic coupling over the air gap 21''' in the generator is increased and hence the mechanical resistance in the generator, this making the counterweight 19 fall slower, due to the fact that the state of equilibrium between the generator and the counterweight is moved to a lower rotation speed and vice versa, see the control rule illustrated in the diagram of FIG. 16*a*. Since the power output from the generator is a product of rotation speed and torque, the power level becomes even, whereas the rotation speed varies in the opposite direction in relation to the g-force and the input torque. It works due to the fact that the peak rotation speed of a generator generally is higher than the nominal rotation speed thereof. The generator should manage a peak rotation speed that is at least 50% higher than the nominal rotation speed.

Figure 12C:
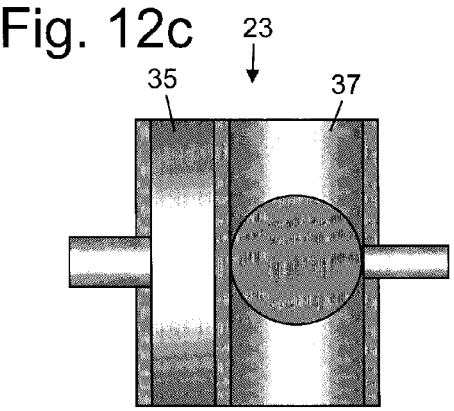
Figure 12D:
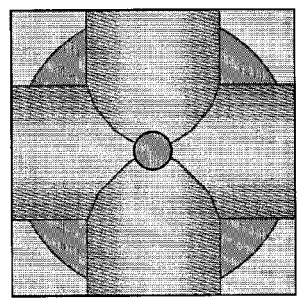

For a constant electrical load a state of equilibrium is obtained, i.e. the rotation speed of the generator 21 is obtained, which gives a mechanical resistance in the generator that is as high as the motive force provided by the counterweight 19 as described above. By controlling the mechanical torque input to the generator the state of equilibrium is displaced and thereby the rotation speed, at which the state of equilibrium is obtained. The input torque can be adjusted using a gear box 37 having a so called variable gear ratio, a CVT ("Continuous Variable Transmission") which can constitute or be included in the gear 23. A lower gear ratio gives a higher torque and a lower rotation speed, which balance each other, but a higher torque also makes the state of equilibrium, between the generator 21 and the counterweight 19, be displaced to a higher rotation speed, this increasing the falling velocity of the counterweight, and vice versa, compare the control rule illustrated in the diagram of FIG. 16*b*. One type of CVT is CVET ("Continuous Variable Electronic Transmission") having its input and output shafts aligned as schematically shown in FIGS. 12*c*, 12 *d*. These figures are only symbolic, since the manufacturer does not want to reveal details regarding the mechanical design thereof. Usually, variable transmission gear boxes only manage limited torques and a relatively low maximum gear ratio. To minimize the input torque and to increase the gear ratio a planetary gear 35 can be connected before the variable transmission as shown in FIG. 12*c*.

Figure 16B:
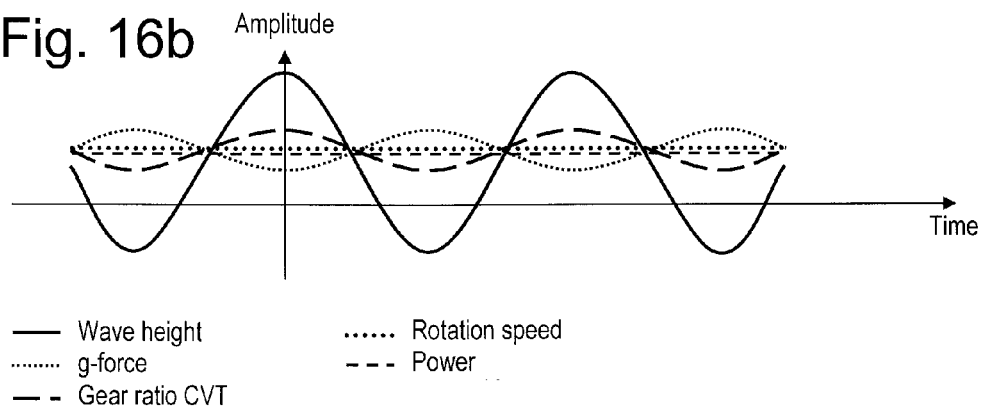
FIG. 16b is a diagram illustrating a control rule for compensating for varying accelerations and decelerations of a counterweight using a CVT.
Figure 16C:
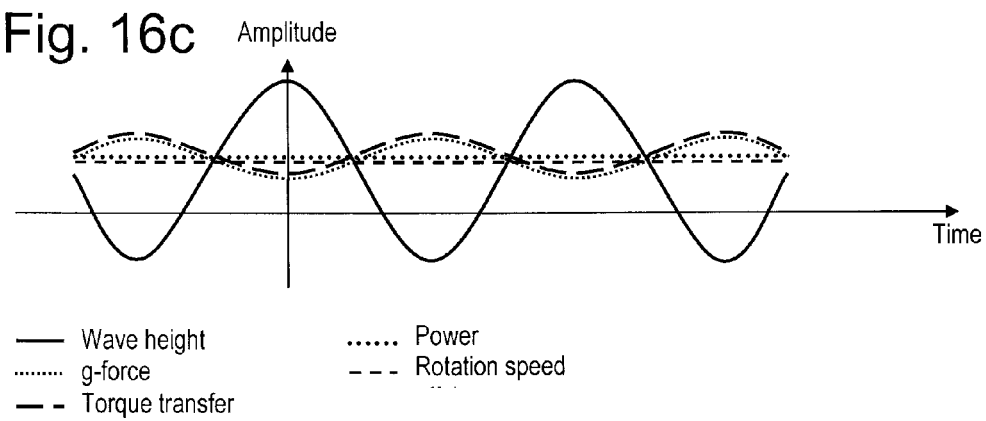
FIG. 16c is a diagram illustrating a control rule for compensating for varying accelerations and decelerations of a counterweight using the sliding clutch of the mechanism for reverse feeding.

The sliding clutch 25, 25' for reverse feeding between the counterweight drum 15 and the anchor drum 9, which according to the description above can be used for keeping the anchor line 7 tensed, can at the same time be used for reducing the torque provided by the counterweight 19, which displaces the state of equilibrium of the generator 21 and the counterweight 19 in the same way as a variable gear does, see the control rule illustrated in the diagram of FIG. 16*c* and also compare to the diagram of FIG. 16*b*. Full power of the generator and full speed of the counterweight are reached when the sliding clutch 25, 25' for reverse feeding is completely disengaged, so that the full torque from the counterweight is applied over the generator. When the average wave height sinks, the torque transferred in the sliding clutch for reverse feeding increases, this reducing the torque over the generator 21 and hereby the falling speed of the counterweight is reduced. As a sliding clutch e.g. a magnetic particle clutch can be used, which gives low heat losses for low rotation speeds. The torque can be very accurately controlling using the level of a feeding current, so that the higher the current the higher the transferred torque and thereby also a higher braking action.

By using a counterweight drum having a conical shape, not shown, the radius of the point of contact of the counterweight line 17 around the counterweight drum can be increased the more the counterweight 19 is wound around its drum. The radius and thereby the torque increase the higher the counterweight is hoisted up and thereby makes the generator 21 rotate faster. In that way, the falling speed of the counterweight 19 and the power output from the generator increase with an increased average wave height. This principle of controlling of the span of the counterweight is self-controlling and hence does not have to be controlled by a control system such as in the other methods, but lacks the ability to compensate for variations in the g-force of the counterweight or the force with which the counterweight acts on the power train, i.e. mainly the tension in the counterweight line.

It is possible to design the wave power plant 1 for automatic installation. Then, the depart position is, that the bottom foundation 5 and the counterweight 19 are hitched at parts of the support bar 13 or at the support structure 141 with their corresponding lines 7, 17 completely wound around the drums. The wave power plant is set into connection with the electrical distribution network and the control system is started. The disengagement mechanism for the anti-reverse mechanism of the anchor drum is set to a locked position according to a control signal from the control system, so that the anchor drum 7 cannot be disengaged, despite the counterweight/s 19 being in their top positions. In the shown embodiment it means that the sliding clutch 55 mounted around the anti-reverse mechanism of the anchor drum 51 is set to maximum transfer of force or torque, which is enough to carry the entire weight of the bottom foundation 5. The sliding clutch 25 for reverse feeding can be disengaged.

Thereafter the control system releases hitches, not shown, that hold the counterweight 19 and the bottom foundation 5, so that the bottom foundation starts to fall towards the bottom 8 of the water pool. Then, the line 7 of the anchor drum is unwound and the driveshaft 11 starts to rotate and drive the generator/generators 21. The control system controls for maximum power and thereby the falling speed of the bottom foundation 5 is reduced as much as possible by the electrical power that is produced. Furthermore, the buoy 3 is suitably equipped with an echo-sounder, not shown, measuring the water depth on the site where the installation takes place. The anchor drum 9 is equipped with the same type of sensor, not shown, as is mounted in the counterweight drum/s/ 15 and the control system can in this way measure the length of the corresponding anchor line 7 that is unwound from the anchor drum. The control system can from these values calculate when the bottom foundation 5 starts to approach the bottom 8. To reduce the force of impact the falling speed of the bottom foundation is reduced by the sliding clutch 25 for reverse feeding. When the bottom foundation 5 reaches the bottom 8, the driveshaft 11 stops rotating and the counterweight/counterweights 19 instead start/s/ to fall and continue to drive the generator/generators 21. The free-wheeling mechanism for the rotation of the anchor drum 9 in relation to the driveshaft is activated, so that the anchor drum can rotate in one direction in relation to the driveshaft. In the shown embodiment this means that the sliding clutch 55 in the anchor drum is set to a normal mode, this meaning that the force transferred by the sliding clutch is reduced so that the force is not sufficient to lift the bottom foundation 5. Then, the control system is set to an operational mode.

The exterior electrical connection of the generator 21 can be achieved without using slip rings, brushes and similar devices, even in those case where the stator 21" of the generator is mounted inside counterweight drum 15. The stator 21" of the generator includes, in a conventional way, electrical windings, in which an electric voltage is induced when it is rotating and which are connected to an electric cable 41 that is partly wound on the counterweight drum in parallel with the counterweight line 17, see FIG. 4, but closer to the anchor drum 9. The electric cable extends from the counterweight drum 15 down to a movable connector 43 that can move along the anchor line 7. At the connector the electric cable 41 is connected to yet another electric cable 45, which e.g. extends to a special connector buoy 45. Thereby the wave power plant 1 can manage to be rotated, when the waves change their direction, without lines and cables getting entangled with each other.

Since the first electric cable 41 is wound on the same drum as the counterweight 19, the connector 43 to will slide along the anchor line 15 being substantially always at the same distance below the counterweight. Hereby it can be avoided that the counterweight and the electric cables 41, 45 become located too close to each other.

Figure 9A:
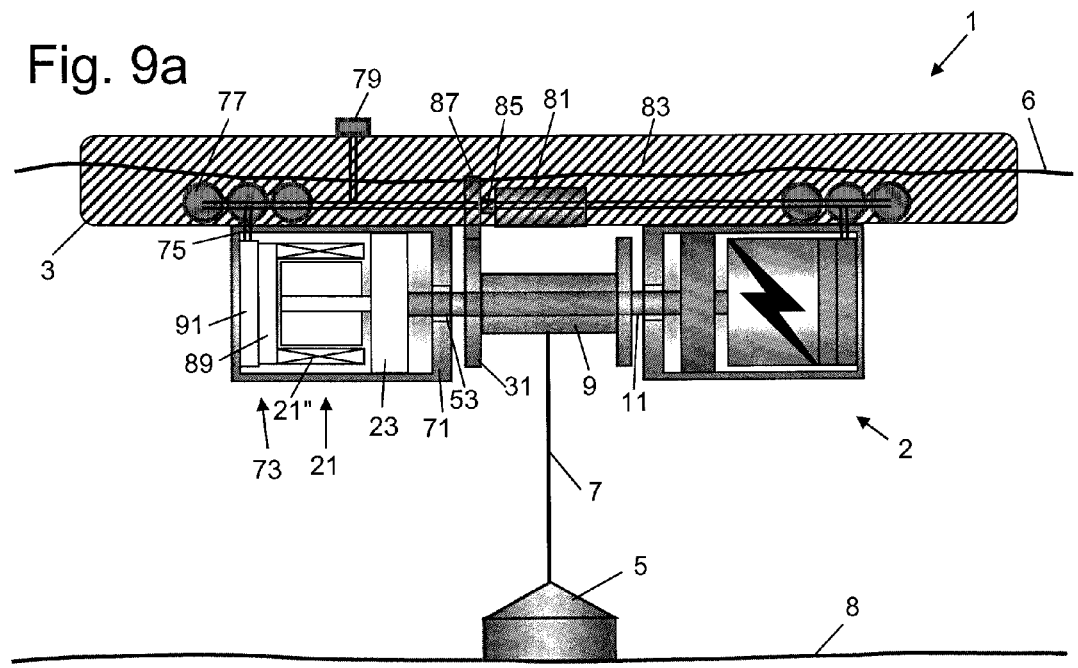
FIG. 9a is a front view of a wave power plant having an energy accumulation device designed as an elastic means.

In an alternative way of energy accumulation the energy can be stored as a gas pressure in one or more tanks. Such a wave power plant 1 is schematically shown in FIG. 9a. Here the anchor drum 9 has to be connected to the driveshaft 11 only via an anti-reverse mechanism 53, compare the anti-reverse mechanism in the shaft support bar 13 in FIGS. 5a and 5b. Support bars are not required, but the driveshaft can be journalled directly in the generator housing or the generator casing 71, which replaces the counterweight drum 15 and which in this case can enclose a fixed gear mechanism such as a planetary gear 35, the generator 21 and a compressor/gas pump 73. The casing is rigidly attached to the buoy 3, such as to the underside thereof as shown in the figure or centred in the buoy, if a power train room 20 according to the description above is used for mounting of the power train 2. A gas pipe 75 extends from the compressor/gas pump 73 to gas tanks 77, suitably located at or in the buoy. The gas tanks are also coupled to an over pressure valve 79 and a pneumatic motor 81. Gearwheels 87 are mounted on the output shaft 85 of this motor, the gearwheels cooperating with teeth on the flange 31 of the anchor drum 9.

The compressor/gas pump 73 can be a so called scroll pump and then it has a movable part 89 rigidly connected to the stator 2" of the generator 21 and a part 91 attached to the housing 71. Here, the anti-reverse mechanism 53 for the driveshaft acts against the housing.

When the driveshaft 11 is rotated by the rising of the buoy 3 in this embodiment, a gas pressure is built in the gas tanks 77 by the scroll pump 73. This gas pressure corresponds to accumulated energy. In pace with the increasing gas pressure, also the counteracting force against the driveshaft rotation increases. Thus, higher waves that cause a higher average rotation speed of the driveshaft 11 create a higher gas pressure and thereby produce a higher counteracting torque between the rotor 21' and stator 21" of the generator. Hence, the control system does not have to actively control and optimize the operation but the equalization occurs due to the inertia of the pneumatic pressure. Since the energy accumulation takes place by a pneumatic pressure being built, the overpressure valve 79 can possibly be used instead of the sliding clutch 53 between the anchor drum 9 and the driveshaft 11. However, the sliding clutch has an advantage derived from the fact that it protects against shock loads. When the anchor drum 9 is not rotated by its coupling to the anchor line 7, such as when the buoy 3 is sinking, it is instead rotated backwards to stretch the anchor line by the fact that the pneumatic motor 81 is rotating, driving the gearwheel 87 acting on the flange 31 of the anchor drum.

Figure 9B:
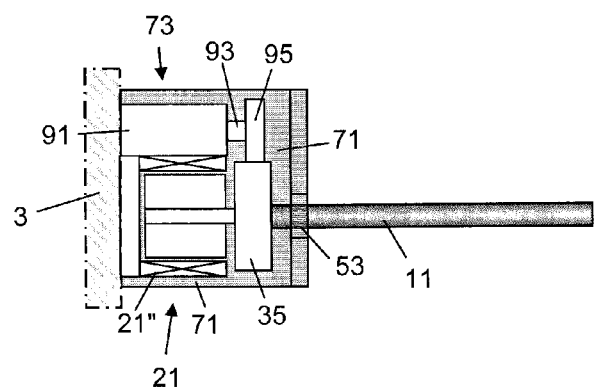
FIG. 9b shows an alternative connection of the elastic means of FIG. 9a, FIG. 10a is a schematic front view of a wave power plant including an energy accumulation device and a mechanism for reverse feeding.

Also when using a gas return pressure it is possible to have the stator 21" of the generator be fixed to the buoy 3 and instead connect the compressor 73 to the gear ring 165 of the planetary gear 35, see FIG. 9b. In this case the stator of the generator is rigidly attached to the generator housing 71. Also, the generator chassis 91 is rigidly attached to the generator housing whereas the gear wheel 95 of the compressor 73 on the driveshaft 93 thereof is connected to the gear ring of the planetary gear, either directly as shown or via a toothed belt/chain. The gear ring rotates freely around the input driveshaft 11.

This design of the power train 2 can have the following advantages:

No sliding clutches are required in the anchor drum 9 or in the mechanism for reverse feeding.

No counterweights are required and thereby no g-force and no counterweight span exist that must be controlled, since the higher waves, the higher gas pressure and torque over the generator 21.

Possible problems associated with counterweights and lines, exterior electric cables, effects of acceleration, centre of gravity, etc. can be completely eliminated or be reduced.

The fact that no counterweight is used gives a lower moving weight and thereby the bottom foundation 5 can also be made smaller, i.e. have a smaller mass. Also, the buoyancy of the buoy 3 can be reduced to the same extent.

It stands a shallower installation depth.

Only the anchor drum has to be exposed to water of the ocean whereas other components can be encapsulated.

The housing for the gear mechanism and the generator can be made with smaller diameters than for the counterweight drum used in the embodiments described above.

The same power train 2 that have been described above can be used in other embodiments of the wave power plant as appears from FIGS. 7a, 7b and 7c. Instead of a bottom foundation bottom fastening devices 61, 63 are provided which are attached to the bottom 8. These bottom fastening devices are designed as frames or pillars which extend upwards from the bottom, and the driveshaft 11 in the power train is journalled in the frames or the pillars. In FIGS. 7a and 7b two vertical pillars are used, which are located completely beneath the water surface 6 and extend upwards from the bottom beneath the buoy 3, and the driveshaft is journalled in these pillars. In the embodiments of FIGS. 7a and 7b the anchor line 7 is fixed to the buoy. In FIG. 7b the power train is mounted so close to the bottom of the pool of water that the counterweights are instead designed as floating bodies 19'. The frame according to FIG. 7c includes two vertical pillars extending upwards from the bottom 8 over the water surface 6 at the sides of the buoy 3. The pillars are at their top portions connected by a horizontal beam 64, which is located above the buoy and from which support bar parts similar to the support bar 13 described above protrude downwards. The driveshaft 11 of the power train is journalled in these support bar parts. In particular, it can be observed, that in the embodiment of to FIG. 7c energy is absorbed from the waves only when the water surface 6 and the buoy 3 are sinking contrary to the process of the other embodiments, in which energy is only absorbed from the waves when the water surface and the buoy are rising. Then, the buoy must be given a weight that is greater than that of the counterweight 19 and be given a sufficient volume/buoyancy, so that it still is capable of floating at the water surface 6. This is shown in FIG. 7c as the buoy 3 being rigidly attached to a ballast 5". In this embodiment the line 17 of the counterweight 19 is wound around the counterweight drum 15 when the wave is sinking, this significantly reducing the movement span and the variation in g-force thereof. For an appropriate dimensioning and for periodical waves the counterweight can in principle be held still. It is also possible to keep the counterweight above the water surface 6, this giving a higher motive force in relation to the mass of the counterweight. This embodiment is particular suited for places where foundations are already provided, e.g. for wind power plants, where the counterweight and its line 17 can run inside the mast, or for oil platforms.

Figure 7D:
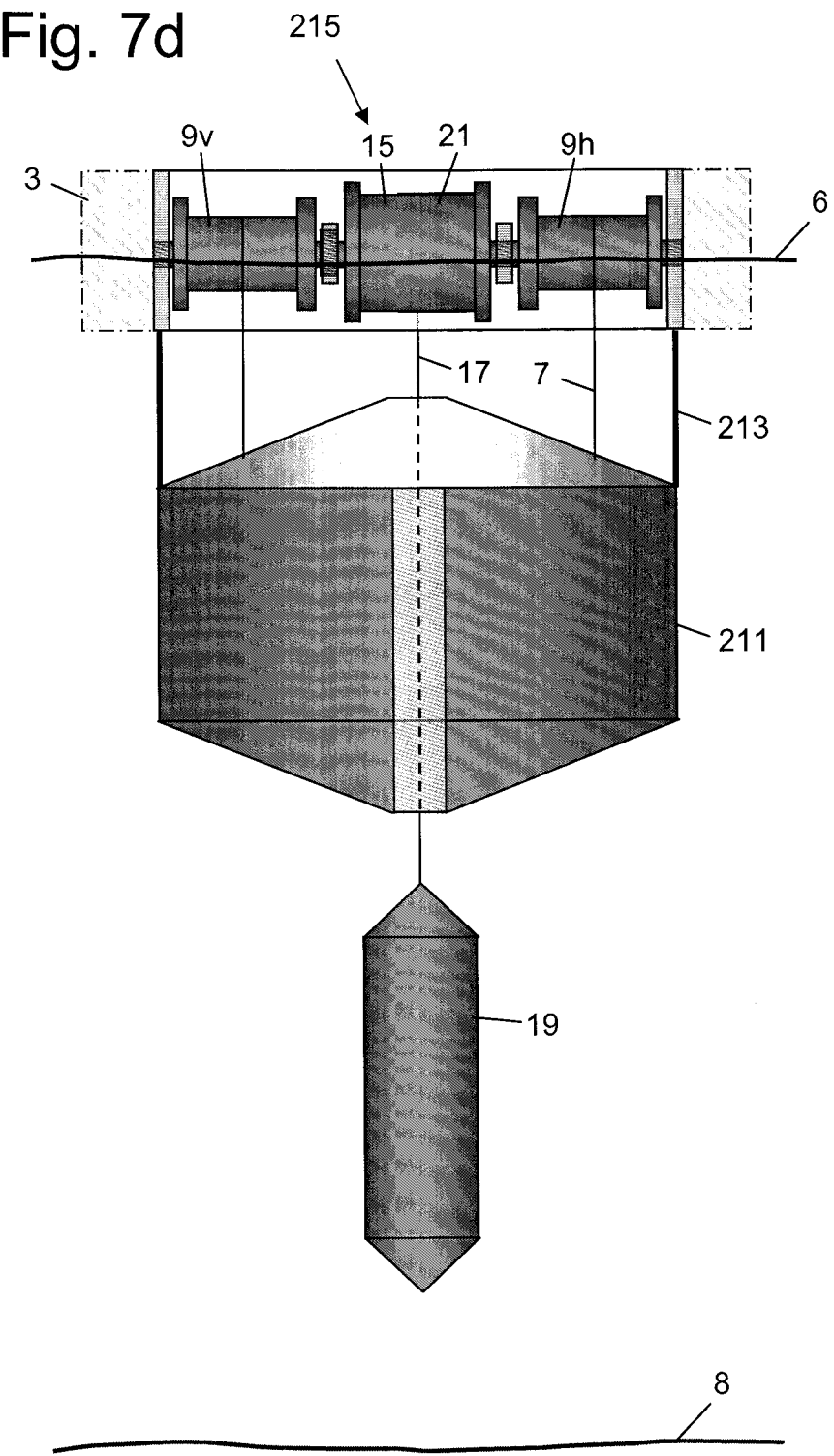
FIG. 7d is a front view of a wave power plant having an alternative driving operation of the driveshaft obtained by cooperation with a weight suspended in an elastic means.

An alternative embodiment of a wave power plant 1 having a power train 215 according to FIG. 15a including a counterweight drum 15 located centrally, between two anchor drums 9v, 9h is shown in FIG. 7d. In this variant the driveshaft 11 is driven by a weight or load 211, which is suspended beneath the buoy 3 in elastic means 213 that for example can include sets of helical springs or of air springs. The anchor lines are also attached to the weight. The weight 211 can have a considerable mass compared to that of the buoy 3 or generally in relation to that of other parts of the wave power plant. The driving of the driveshaft occurs by cooperation between the buoy 3 and the weight 211. When the buoy, after having passed a wave crest, sinks, also the weight moves downwards. Thereafter, when the buoy slows down and changes its movement direction in the next wave trough, the weight 211 continues, due to its inertia, to first move downwards, this stretching and prolonging the elastic means 213 and unwinding the anchor lines 17 so that the anchor drums 9v and 9h are rotated, driving the driveshaft 11 to rotate. When the elastic means are prolonged, their force on the weight 211 increases, so that the downward movement thereof is gradually stopped. Thereafter the force from the elastic means becomes so great, that the weight will move upwards. This occurs in the rising movement of the buoy 3. Thereupon, when the buoy 3 slows down again to change its movement direction in the next wave crest, the weight continues to move upwards due to the inertia. The elastic means 213 are then retracted and thereby their traction force on the weight 211 is reduced, so that it is no longer balanced by the gravity force acting on the weight. At the same time the anchor drums 9 can be fed in the reverse direction, tensing the anchor lines 7 before the next driving of the driveshaft 11. The weight is then gradually slowed down to a stop and thereafter again to start to move downwards.

The counterweight line 7 extends through a through-hole in the weight 211 down to the counterweight 19 that moves with a phase shift in relation to the wave movements, which can reduce the vertical movements thereof and reduce the magnitude of the accelerations and retardations during the wave movements, so that the torque applied to the generator 21 becomes somewhat more even, this thereby requiring less adjustment of the rotation speed thereof. Such an embodiment can e.g. be advantageous for large water depths, where it can be difficult to use an anchor line 7 attached to the bottom 8 for driving of the driveshaft.

Figure 8A:
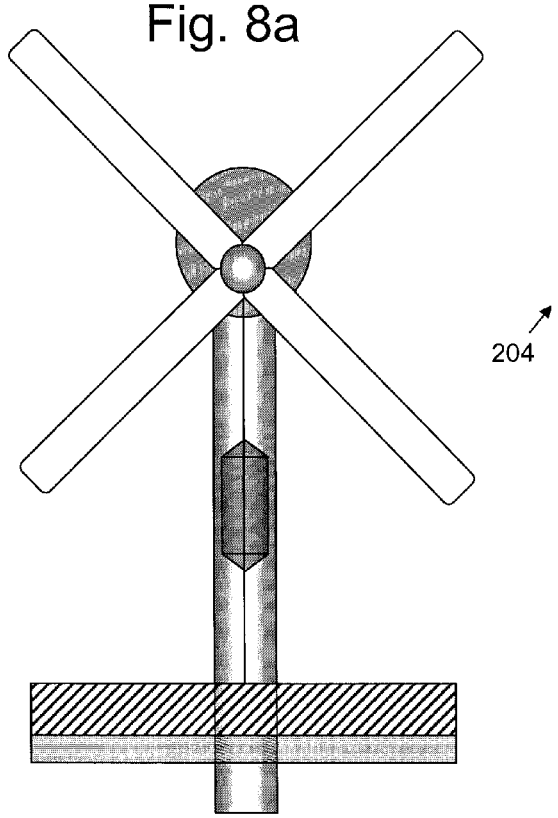
FIG. 8a is a front view of a combined wind and wave power plant.
Figure 8B:
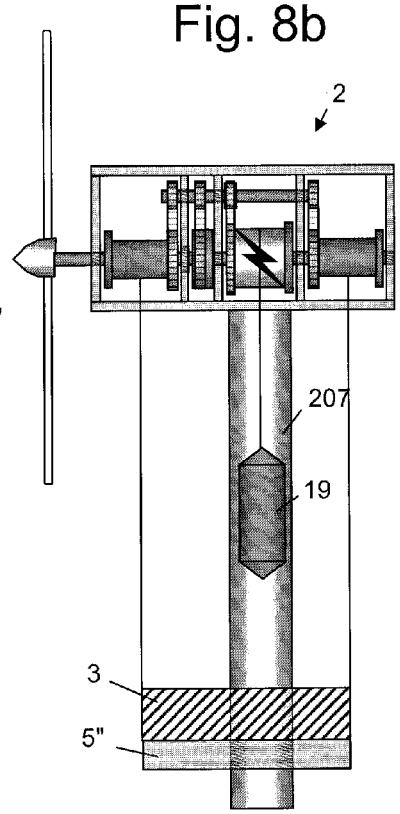
FIG. 8b is a side view of the combined wind and wave power plant of FIG. 8a, FIG. 8c is a detail view of a power train comprised in the combined wind and wave power plant of FIG. 8b.
Figure 8C:
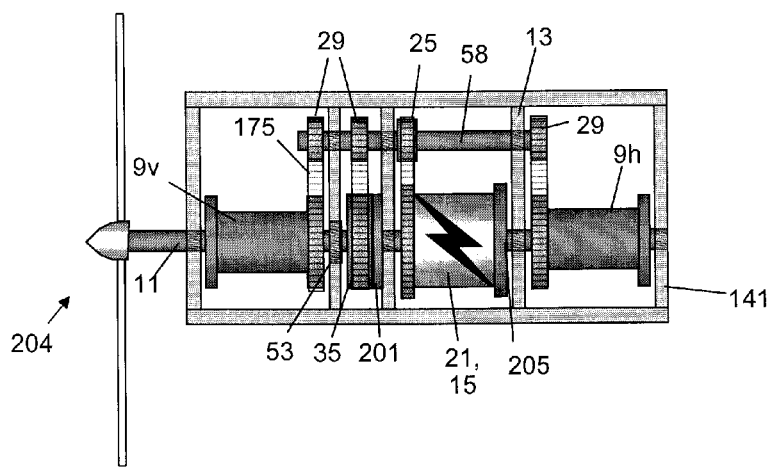
FIG. 8d is a front view of a wind power plant, in which a transmission of the same kind is used.
FIG. 8e is a side view of the wind power plant of FIG. 8d.
FIG. 8f is a detail view of the wind power plant of FIG. 8e having a pneumatic energy accumulation device.
Figure 12E:
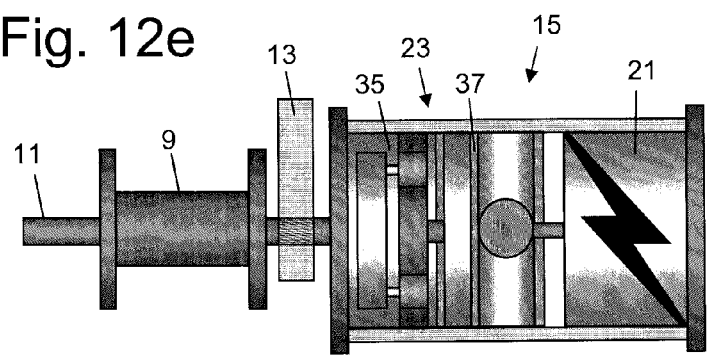

In one embodiment, in which the wave power plant is mounted in a wind power plant, it is possible to integrate the transmission from the rotor blades of the wind power plant with the driving by the waves, so that the same gearbox and generator can be used, see FIGS. 8a, 8b and 8c. The transmission can principally be compared to that shown in FIGS. 15a, 15b and 15e, which will be described hereinafter. The transmission model having a stationary stator according to FIG. 15f can also be used in a similar way but this will not be described further here. The main difference is the mounting of the planetary gear 35 in relation to the stator of the generator. The function of the planetary gear is in this embodiment to combine the driving by the wind and wave movements by having the rotor of the wind power plant rotate the planet gear carrier 161 of the planetary gear, while the buoy 3 including a ballast 5" is driving the gear ring 165 of the planetary gear, see also FIGS. 12a and 12b. In this way, the rotations and torques obtained from the wind and wave movements, respectively, can be added to each other, together driving the sun gear 167. Neither the planet carrier nor the gear ring is allowed to rotate backwards, which for the planet carrier is achieved by the anti-reverse mechanism 53 in the shaft support bar 13 and for the gear ring by the sliding clutch 201 that has a function similar to an anti-reverse mechanism. The sliding clutch 201 has a function corresponding to that of the sliding clutch of the anchor drum, see FIG. 5b and the descriptions thereof, but it is in this embodiment mounted between the shaft support bar 13 and the planetary gear 35, this making it possible to limit the torque and energy absorption from both wind and wave movements using one and the same sliding clutch. The generator 21 is mounted alone in the counterweight drum 15 including the connected counterweight 19, this providing the same equalizing properties as has been described for the other embodiments. The reverse feeding of the anchor drums is also accomplished in the same way from the counterweight drum 15 via the gear ring 29 and a toothed belt/chain 175 to the link shaft 58, which in turn is coupled in the corresponding way to the anchor drums 9v and 9h. The diameter of the anchor drums 9v and 9h in combination with the weight of the buoy 3 and the ballast 5" determines the torque applied over the gear ring 165 of the planetary gear and the rotation speed that the gear ring obtains. These parameters are chosen to match the torque from the wind turbine and the size of the generator. As long as the torque obtained from the driving from wind and waves is higher than the counteracting torque given by the counterweight 19, energy can be accumulated in the counterweight 19 from both wind and wave movements. Since the torque from the rotor 204 of the wind power plant varies depending on the wind force whereas the torque from the driving by the waves is constant, it may be necessary to mount a variable transmission gearbox before the planetary gear in the same way as shown in FIG. 12e, but in this embodiment the variable transmission gearbox adapts the torque from the driving by the wind to the driving by the waves according to the current wind force. To prevent the tower 207 of the wind power plant from being damaged by the buoy 3, some kind of slide mechanism, not shown, is used for guiding the buoy along the tower of the wind power plant.

Figure 8D:
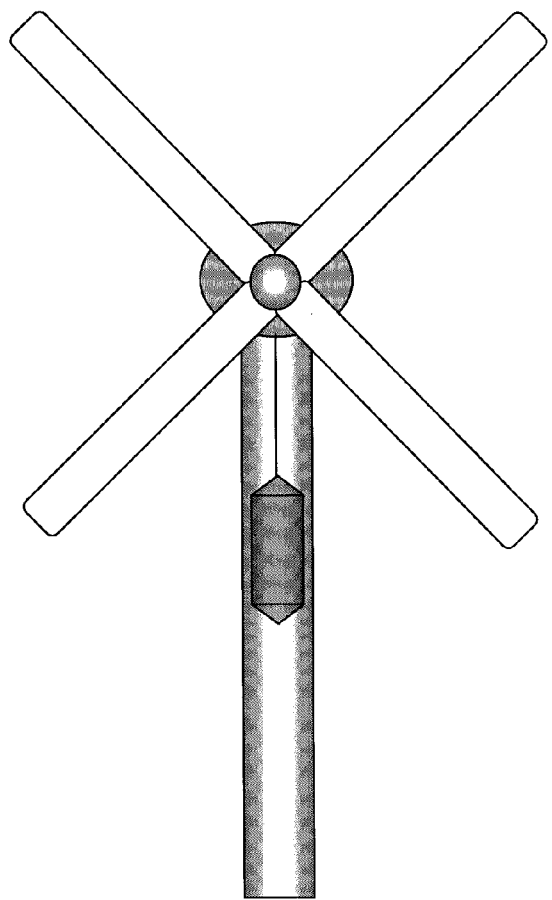
Figure 8E:
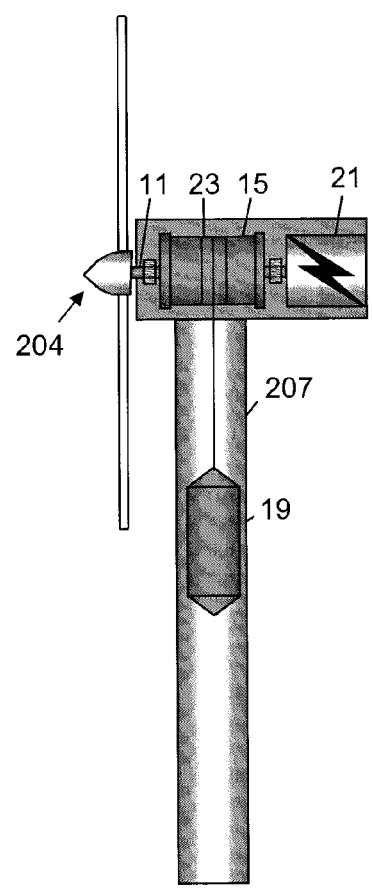
Figure 8F:
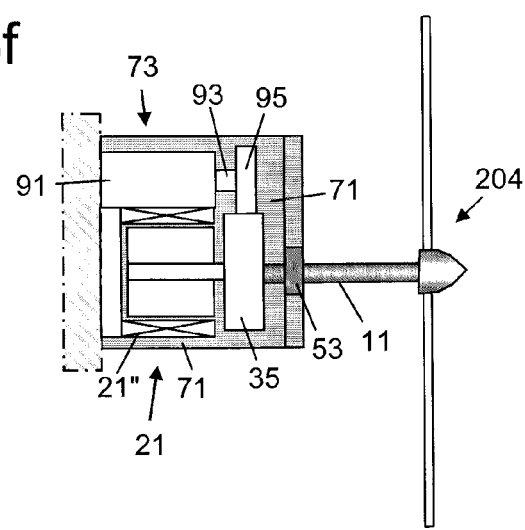

Breaking gearboxes is a large problem for wind power plants of today. The transmission of the wave power plant can also be used in a wind power plant without any driving by waves in order to utilize its capabilities to limit the torque and energy absorption. In this case the same type of transmission design as described in FIG. 3d can be used but without an anchor drum 9. The rotor 204 of the wind power plant is directly connected to the driveshaft 11, as shown in FIGS. 8d and 8e. The counterweight 19 can move inside the tower 207 of the wind power plant. When used in a wind power plant, gas return pressure can also be used instead of a counterweight as shown in FIG. 8f. This transmission design is described in more detail with reference to FIG. 9b. Then, the counterweight can be omitted and its inertia will then have no effect, which can be an advantage.

[S3][S4][S5] In the embodiments described above, the electromagnetic coupling between the rotor and stator of the generator 21 is utilized in a plurality of cases, whereas in other cases a transmission designed in a special way is used for achieving a continuous driving of the generator. Energy storage and reverse feeding can be accomplished in different ways. Generally, a wave power plant 1 can include components as appears from FIG. 10a. An anchor drum 9 included in a power train 2 is in some way mechanically coupled with both a buoy 3 and with an object 8', which can be considered to have a more stationary position than the buoy and which can be the bottom, e.g. a bottom fastening device 5', see also FIG. 10b, at least one of these two mechanical couplings 7", 7''' including an elongated means, such as a flexible means, typically a line or a wire, but also a stiff rod can be used in special cases. The anchor drum can be located in a suitable way in relation to the buoy such as under, inside or above it. It can rotate in two directions as shown by arrows 101, 102. The anchor drum 9 drives, when it is rotating in one direction, a driveshaft 11, which thus can only rotate in one direction as shown by the arrow 103. The driveshaft is mechanically coupled to a generator 21, the coupling being symbolically illustrated at 23'. The coupling and/or the generator are arranged in such a way that, when the driveshaft 11 is rotating, part of the rotational energy is accumulated in an energy accumulation device 105. When the driveshaft is not capable of rotating the generator, instead the energy accumulation device drives the generator. The energy stored in the energy accumulation device 105 can also be used to rotate the anchor drum 9 in the reverse direction and for this purpose the energy accumulation device can be coupled to a mechanism 107 for reverse feeding.

In the case which utilizes the electromagnetic coupling between the two parts of generator 21 that are rotatable in relation to each other, the driveshaft 11 is mechanically coupled to the first part 21' by the coupling 23' for driving this part to rotate in the direction shown by the arrow 23, the electromagnetic coupling between the parts of the generator giving a torque counteracting the rotation of the driveshaft and also making the second part 21" rotate in the same direction, see FIG. 10b. The second part 21" of the generator is in some way coupled, so that it, in its rotational movement because of the rotation of the driveshaft 11, accumulates part of the rotational energy in the energy storage device 105. When the rotation speed of the driveshaft is so low that it is no longer capable of rotating the second part of the generator, the energy accumulation device instead drives the second part of the generator to rotate in a direction opposite to the previous direction.

Figure 14:
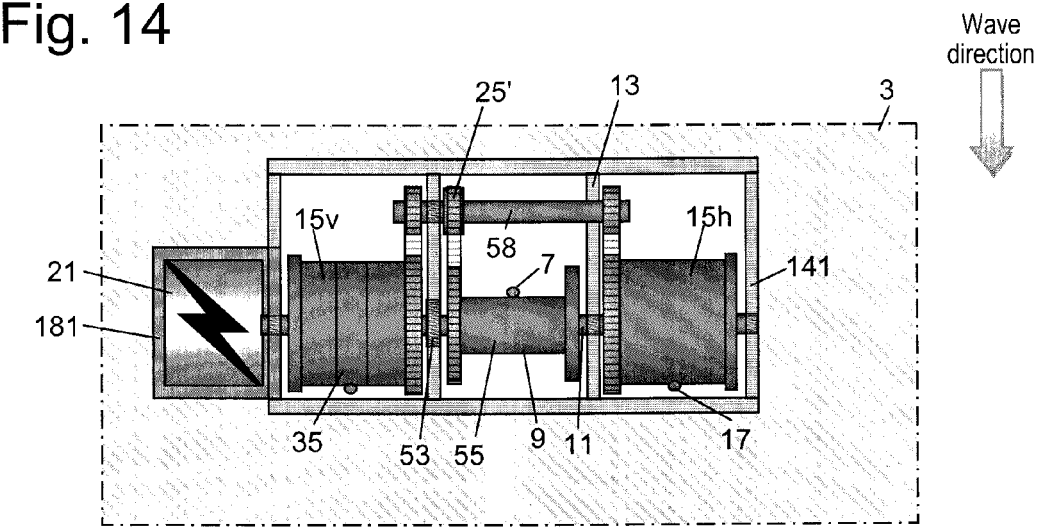

In the embodiments described above, two generators 21 are used. However, since the generator together with associated power electronic circuits and possible planetary gearbox is a relatively costly part of the wave power plant 1, embodiments having only one generator can be more cost efficient. Below possible embodiments having only one generator will be described. In a first embodiment including two counterweights 19 and a stator of the generator 2 fixed to the buoy 3, see FIG. 14, also, as shown in e.g. FIG. 2f, a shaft for reverse feeding or a link shaft 58 is provided. The link shaft couples the movements of the two counterweight drums together, so that the motive force from the right counterweight drum 15h is transferred to the left counterweight drum 15v. The left counterweight drum includes a planetary gear 35, which steps up the rotation speed of the generator 21 and also limits the torque by the coupling of the gear ring to the left counterweight drum and the counterweight 19. The location of the winding drums is otherwise the same as in the embodiments described above and therefore, the buoy 3 in a wave power plant designed in this way obtains approximately the same stability or positioning towards the waves as in the embodiments including two generators. The generator 21 can be mounted in a separate generator housing 181, the stator 21" of the generator rigidly attached to the buoy, as shown in the figure, or in or to the left counterweight drum 15v.

As illustrated, the link shaft 58 can be placed in front of the driveshaft 11 seen in the wave direction. This gives a better space for drifting away from the bottom foundation 5. The drifting results in the fact that the anchor line 7 that is not allowed to come in contact with the driveshaft frame 141 extends in an oblique direction in relation to the vertical. Alternatively, the link shaft 58 can be placed above the driveshaft 11, either in an oblique position above or straight above.

Furthermore, it is possible to design the power train 2, so that only one counterweight 19 is used without the wave power plant loosing stability or positioning towards the wave direction. Instead such a design can, see FIG. 15a for a front view and 15b for a side view, enhance the positioning in relation to the wave direction. The anchor line 7 is by a Y-coupling 191 divided into two part lines 7' and they are guided to be wound around one anchor drum 9v, 9h each, the anchor drums being located on each side of the single counterweight drum 15'. Guide rollers 193, corresponding to those described with reference to FIGS. 13a, 13b and 13c, divert the part lines, so that they are wound correctly on the anchor drums. The counterweight 19 can move freely despite the fact that the anchor lines joins in the Y-coupling, due to the fact that the points at the counterweight drum and the anchor drum 5 where the respective line is wound are located on opposite sides of the driveshaft 11. The drift from the foundation 5 also gives an angle for the anchor line 7, 7', this giving extra margins. For an additional safety margin the Y-coupling 191 can be placed below the lowest possible position of the counterweight 19, not shown.

In FIGS. 15c and 15d an alternative of a straight winding of the divided anchor lines 7' around the anchor drum 9v and 9h is shown. A cross bar 221 holds the lines at a distance from each other and is placed immediately above the Y-coupling 191. To decrease the risk of collision between the part anchor lines 7' and the counterweight 19, the cross bar 221 can be placed below the lowest possible position of the counterweight. An advantage associated with this alternative is that the part of the anchor line 7, which connects the rod 221 to the bottom foundation 5, can be more or less stiff and e.g. be designed as a ground cable or chain, whereas the part anchor lines 7' can be more flexible to allow them to be wound around the anchor drums 9v and 9h. Furthermore, the cross bar 221 can be designed to carry the load of itself and the undivided anchor line 7, this resulting in that a lower force is required for driving the reverse feeding, not shown in these figures.

In FIG. 15e the power train in a wave power plant is shown according to FIGS. 15a and 15b as seen from below and including more details. The driveshaft 11 is here rigidly attached to only one of the anchor drums, e.g. as shown to the left anchor drum 9v. The left anchor drum 9v, the driveshaft and the single anchor drum 15' have the same functions and structures as in embodiments described above in which the generator 21 is built into the counterweight drum. The second anchor drum, the right drum 9h, is journalled so that it can rotate freely but its motive force is transferred to the left anchor drum 9v by the link shaft 58. The link shaft can be coupled, via chain pulleys or toothed wheels 203 mounted thereon, to the anchor drums by chains or toothed belts 205 which also run over the toothed flanges 31. Alternatively, the gearwheels 203 can be directly connected to the flanges of the anchor drum in the same way as shown in FIG. 2f. The reverse feeding of the anchor drums is accomplished in the corresponding way as described above but the sliding clutch 25" is in this case coupled to the counterweight drum 15'.

In FIG. 15f an alternative to the power train of FIG. 15e is shown. According to FIG. 15f the stator 21" of the generator is rigidly attached to the buoy 3 in a way corresponding to that shown in FIG. 2g. The generator casing 71 is placed on one side of the single, centrally placed counterweight drum 15', this resulting in that the power train 2 must be made to have a larger width. The anchor drums 9v, 9h must be placed at an equal distance from the counterweight drum in order that the traction force by the counterweight 19 and the foundation 5 via the counterweight lines 7' shall remain centred in the wave power plant 1. This results in the fact that that more support parts or shaft support bars 13, 145 are required for carrying the components of the power train. It is possible to use the same design of the anchor drums as described above with reference to FIG. 15e. However, in that case it can be motivated to simplify the left anchor drum 9v by using a sliding clutch 55' that is displaced outwards or is freely located and use the extra space in the power train room 20 for the power train 2, so that the left anchor drum 9v can be rigidly attached to the first part 11' of the driveshaft in the same way as described above with reference to FIG. 5c whereas the second part 11" of the driveshaft on the other side of the sliding clutch constitutes or is directly connected to the input shaft of the gear 23 and the counterweight 15' rotates around this second part.

In FIGS. 15g and 15h an alternative power train according to FIG. 15f is shown, in which the mechanic parts are to a larger extent encapsulated. In this embodiment, the transmission of power between the driveshaft 11', 11" and the link shaft 58 can advantageously be obtained via gearwheels 209. A high gear ratio as shown in the figure is used to increase the rotation speed of the link shaft and to reduce the torque, this resulting in less wear and smaller dimensions of the power transmission. In this embodiment only the drums 9v, 9h, 15' are exposed to the sea water in the transmission housings 20. The generator 21 together with all associated power electronic circuits and the link shaft 58 including the power transmission are encapsulated in a climate controlled environment 195. The mechanism 26 for reverse feeding has in this embodiment been placed on the high speed side of the gear 35, but it could also be placed on the low speed side. An advantage associated with placing the mechanism 26 for reverse feeding on the high speed side is that the space will be used more efficiently since a higher gear ratio in the mechanism for reverse feeding is required compared to the power transmission 210 of the link shaft. However, a high speed rotation in the sliding clutch gives higher transmission losses.

In FIG. 15i an alternative to the mechanism for reverse feeding described with reference to FIG. 15g is shown. Here an electric motor 223 is instead used, which is directly connected to any of the gearwheels 209 on the link shaft 58. The electric motor receives electric current from the battery, not shown, which drives the control system and other electronic devices, not shown. The electric motor is controlled by the control system which in that way can optimize the reverse feeding. It is also possible to drive the mechanism for reverse feeding using a spring mechanism, such as e.g. a helicoidal spring or a constant power spring, not shown.

A wave power plant has been described herein which can have one or more of the following advantages:

The counterweight drum/drums limit/s/ the maximum resistance in the system and give/s/ a sharp limit for the torque acting over the generators.

The energy accumulation is very simple and efficient and can store energy over a long time interval at the same time as the motive force can be held constant in relation to the average wave height during the time interval.

The wave power plant can be dimensioned to utilize the depth on the installation site in an optimum way for the accumulation and for reducing the weight of the counterweights.

The storage of energy is stopped automatically when "the accumulator is full" and it can be achieved without reducing the generated power.

The scalability is very good and the wave power plant can be dimensioned to reach its maximum capacity at a selected wave height to obtain a better utilization factor of the generator.

It is not necessary to over dimension the whole system in order to make it be capable of handling absorption of energy at rare occasions when the mean wave height is considerably higher than normal.

The buoy continuously follows the wave movements independently of the size of the waves. The force limitation in the anchor drum efficiently protects the device from shocks and overloads.

The motive force is constant in relation to the gear ratio, this allowing the use of generators of all types, including synchronous AC generators working at constant or variable rotation speeds.

A minimum of manual efforts for installation, short course of installation which generates electric energy already when the foundation is being lowered.

A substantially simple and durable construction.

A very high utilization factor of generators and transmission.

Long service intervals.

While specific embodiments of the invention have been illustrated and described herein, it is realized that numerous other embodiments may be envisaged and that numerous additional advantages, modifications and changes will readily occur to those skilled in the art without departing from the spirit and scope of the invention. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention. Numerous other embodiments may be envisaged without departing from the spirit and scope of the invention.

The invention claimed is:

1. A wave power plant comprising:
  a buoy arranged at or in a pool of water to be set into motion by movements of the water in the pool of water, wherein the buoy obtains movements, which alternate between a first movement in one direction and a second movement in another direction being different from the first direction,
  a driveshaft, which is rotatably mounted to the buoy, or to a device arranged to give a force counteracting movements of the water in the pool of water,
  a first elongated means, which both is coupled to a device arranged to give a force counteracting the movements of the water in the pool of water or to the buoy, respectively, and is coupled to the driveshaft,
  an electric generator, which is coupled to the driveshaft and includes two parts that are rotatable in relation to each other, a first part and a second part, and
  an energy accumulation device,
  the buoy, the first elongated means, the device arranged to give a force counteracting the movements of the waves, the driveshaft and the energy accumulation device being coupled to each other, so that the coupling between the first elongated means and the driveshaft makes, substantially for first movements of the buoy, the driveshaft rotate in only one direction and thereby drives said two parts of the electric generator to rotate in relation to each other in a first rotational direction and generate electric current and thereby also supply the energy accumulation device with energy, and
  wherein the energy accumulation device is arranged to drive, substantially for second movements, of the buoy, said two parts of the electric generator to rotate in the same first direction in relation to each other and thereby to generate electric current having the same polarity as when the driveshaft drives said two parts of the electric generator to rotate in relation to each other.

2. A wave power plant according to claim 1, comprising a buoy arranged to alternately rise and sink and/or to alternately rock or tilt back and forth at the up- and down-going movements of the water surface, the first movements of the water surface including either one of the up- and down-going movements of the water surface.

3. A wave power plant according to claim 1, wherein
  the driveshaft is mechanically coupled with the first part of the electric generator, an electromagnetic coupling existing over an air gap between the first and second parts of the electric generator at least during relative movements of these parts, and
  the energy accumulation device is mechanically coupled to the second part of the electric generator.

4. A wave power plant according to claim 3, wherein the coupling of the energy accumulation device to the driveshaft via the second part of the electric generator and the first part of the electric generator and the air gap therebetween give a counteracting motive force, which counteracts the rotation of the driveshaft, when the driveshaft, through the coupling between the first elongated means and the driveshaft, rotates and drives the first part of the electric generator,
  so that the second part of the electric generator rotates in a first direction due to the coupling to the driveshaft via the electromagnetic coupling over the air gap and the first part of the electric generator, when the motive force acting on the driveshaft due to the coupling between the first elongated means and the driveshaft exceeds the counteracting motive force and the energy accumulation device then accumulates, due to its mechanical coupling to the second part of the electric generator, energy, the first and second parts of the electric generator at the same time rotating in the same first direction in relation to each other, and
  so that the second part of the electric generator is driven by the energy accumulation device to rotate in the same first direction substantially when the motive force acting on the driveshaft through the coupling between the first elongated means and the driveshaft does not exceed the counteracting motive force, whereby the first- and second parts of the electric generator are made to continue to rotate in the same first direction in relation to each other.

5. A wave power plant according to claim 1, comprising:
  a mechanical gear coupled between the driveshaft and the first part of the electric generator, the driveshaft being coupled to an input side of the mechanical gear and the first part of the electric generator being coupled to a first output side of the mechanical gear,
  an electromagnetic coupling existing over an air gap between the first part and second parts of the electric generator at least during the relative movements of these parts,
  the second part of the electric generator being rigidly attached to the buoy, and
  the energy accumulation device being mechanically coupled to a second output side of the mechanical gear, the second output side being different from the first output side.

6. A wave power plant according to claim 5, wherein the input side of the mechanical gear includes an input shaft and an output side of the mechanical gear includes an output shaft and another output side includes a housing or casing for the mechanical gear.

7. A wave power plant according to claim 1, comprising an anchor drum, which is mounted to rotate in a single direction around the driveshaft and is coupled to the first elongated means to make the anchor drum rotate for said first one of the movements of the buoy and thereby also make the driveshaft rotate.

8. A wave power plant according to claim 7, wherein the first elongated means is a flexible means, a line, wire or chain, which at one end is more or less wound on an anchor drum, and that a mechanism is provided for rotating, for said second movements of the buoy, the anchor drum so that the flexible means is kept in a tensioned state.

9. A wave power plant according to claim 7, wherein the bearing for a providing rotation of the anchor drum around the driveshaft in a single direction, which bearing allows the anchor drum during rotation in the opposite direction to drive the driveshaft to rotate in the opposite direction, includes a coupling for limitation or disengagement of the motive force, with which the anchor drum then acts on the driveshaft.

10. A wave power plant according to claim 1, wherein the driveshaft is rotatably mounted in a buoy and the first elongated means at one end is coupled to a point counteracting movements of the buoy, to a fixed point such as to the bottom of the pool of water or to a device that is stationarily located at or attached to the bottom of the pool of water.

11. A wave power plant according to claim 1, wherein the driveshaft is rotatably mounted to a device fixed placed at the bottom of the pool of water and that the first elongated means at one end is coupled to a buoy.

12. A wave power plant according to claim 11, wherein the driveshaft is placed below the water surface and the energy accumulation device includes at least one floating body.

13. A wave power plant according to claim 1, wherein the driveshaft is rotatably mounted to the buoy and the first elongated means is at one end coupled with a weight elastically connected to the buoy.

14. A wave power plant according to claim 1, wherein the buoy includes a space which functions as an air pocket and in which at least the main part of the driveshaft is located.

15. A wave power plant according to claim 1, wherein the energy accumulation device includes a counterweight arranged as a lead which moves upwards for said first of the movements of the buoy and thereby obtains a larger potential energy, that the coupling between the buoy, the first elongated means, the driveshaft and the counterweight is arranged in such a way that the counterweight moves downwards for said second of the movements of the buoy and wherein the counterweight drives the first and second parts of the generator to rotate in relation to each other in the first direction.

16. A wave power plant according to claim 15, wherein the energy accumulation device includes a counterweight drum mounted to rotate about the driveshaft and a second elongated means for coupling movements of the counterweight to drive the counterweight drum to rotate, the driveshaft being coupled to rotate the first part of the electric generator and the counterweight drum being coupled to rotate the second part of the electric generator, the electric generator generating electric current when its second part rotates in relation to its first part and at the same time provides a torque counteracting this rotation, whereby the first- and second parts of the electric generator are made to rotate in relation to each other always in the same first direction.

17. A wave power plant according to claim 15, wherein the energy accumulation device includes a counterweight drum mounted to rotate about the driveshaft and a second elongated means for coupling movements of the counterweight to drive the counterweight drum to rotate and wherein a mechanical gear is coupled between the driveshaft and the first part of the electric generator, the driveshaft being coupled to an input side of the mechanical gear, the first part of the electric generator being coupled to an first output side of the mechanical gear, the second part of the electric generator being rigidly connected to the buoy and the counterweight drum being mechanically coupled to a second output side of the mechanical gear, the second output side being different from the first output side, so that the driveshaft gives, for said first movements of the buoy, motive forces on the two output sides of the mechanical gear for rotating the first part of the electric generator and for rotating of the counterweight drum to elevate up the counterweight in relation to the driveshaft and so that the counterweight drum gives, for said second movements of the buoy, via its coupling to the second output side of the gear, a motive force for rotating the first part of the electric generator.

18. A wave power plant according to claim 1, wherein the energy accumulating device includes a counterweight drum and a counterweight and the second elongated means is a flexible means, a line, wire or chain, which is at a lower end attached to the counterweight and is at its upper end more or less wound on the counterweight drum.

19. A wave power plant according to claim 1, comprising a control system for controlling the electric load of the electric generator for adjusting the rotation speed between the first and second parts of the electric generator.

20. A wave power plant according to claim 19, wherein the energy accumulation device includes a counterweight or a floating body and the control of the electric load of the electric generator also is used for adjusting the vertical speed of the counterweight or the floating body, respectively, so that the counterweight or the floating body, respectively, moves within an adapted or suitable vertical span during the movements of the buoy.

21. A wave power plant according to claim 20, wherein the control system is arranged to compensate for variations in the torque caused by the inertial of the counterweight or the floating body, respectively, by adjusting the rotation speed between the first and second parts of the electric generator, this giving a continuous, even power output from the electric generator.

22. A wave power plant according to claim 1, wherein the plant includes two electric generators and two associated energy accumulation devices coupled to the driveshaft, the first elongated means being coupled to the driveshaft at a place located between the two pairs of an electric generator and an associated energy accumulation device.

23. A wave power plant according to claim 1, wherein the first elongated means at least at one end includes two partial means, a first partial means being coupled to the driveshaft on one side of the electric generator and another partial means being coupled to the driveshaft on an opposite side of the electric generator.

24. A wave power plant according to claim 1, wherein the plant includes an anchor drum coupled to the first elongated means and that the first elongated means includes a flexible means, a line, wire or chain, which is at least at one of its ends divided into two partial means, one of which is more or less wound on corresponding winding surfaces of the anchor drum, the winding surfaces including helicoidally extending grooves having opposite helicoidal directions.

25. A wave power plant according to claim 1, wherein the energy accumulation device includes two counterweight drums mounted to rotate about the driveshaft and a flexible means, a line, wire or chain which is at least at one of its ends divided in two flexible partial means, each one of which is more or less wound on corresponding winding surfaces of the counterweight drums, the winding surfaces including helicoidally running grooves having opposite helicoidal directions.

26. A wave power plant comprising:
a buoy arranged to be set into motion by water movements which alternate between a first movement in one direction and a second movement in another direction;
a driveshaft being one of rotatably mounted to the buoy and rotatably mounted to a device arranged to give a force counteracting the water movements;

a first line being coupled to one of the device arranged to give a force counteracting the water movements and the buoy, and being coupled to the driveshaft;

an electric generator coupled to the driveshaft and having first and second parts rotatable in relation to each other; and an energy accumulation device;

wherein the buoy, the first line, the device arranged to give a force counteracting the water movements, the driveshaft and the energy accumulation device are coupled to each other such that the coupling between the first line and the driveshaft causes, substantially for first movements of the buoy, the driveshaft to rotate in only one direction to thereby drive rotation of said two parts of the electric generator in relation to each other in a first direction to generate electric current and to thereby supply the energy accumulation device with energy; and wherein the energy accumulation device is arranged to drive rotation, substantially for second movements of the buoy, of said two parts of the electric generator in the first direction in relation to each other thereby generating electric current having the same polarity as when the driveshaft drives said two parts of the electric generator to rotate in relation to each other.

* * * * *